(12) United States Patent
Pederson

(10) Patent No.: US 10,090,925 B2
(45) Date of Patent: *Oct. 2, 2018

(54) LED LIGHT FIXTURE

(71) Applicant: Federal Law Enforcement Development Services, Inc., St. Cloud, MN (US)

(72) Inventor: John C. Pederson, Merritt Island, FL (US)

(73) Assignee: Federal Law Enforcement Development Services, Inc., St. Cloud, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/283,979

(22) Filed: Oct. 3, 2016

(65) Prior Publication Data

US 2017/0026117 A1 Jan. 26, 2017

Related U.S. Application Data

(63) Continuation of application No. 14/817,411, filed on Aug. 4, 2015, now Pat. No. 9,461,748, which is a
(Continued)

(51) Int. Cl.
*H04B 10/00* (2013.01)
*H04B 10/116* (2013.01)
(Continued)

(52) U.S. Cl.
CPC .............. *H04B 10/116* (2013.01); *F21K 9/20* (2016.08); *F21V 3/049* (2013.01); *F21V 5/04* (2013.01); *F21V 23/003* (2013.01); *H04B 10/1143* (2013.01); *H04B 10/1149* (2013.01); *H04B 10/40* (2013.01); *H04B 10/502* (2013.01); *H05B 33/0815* (2013.01); *H05B 33/0854* (2013.01); *H05B 33/0857* (2013.01); *H05B 37/0272* (2013.01); *F21Y 2101/00* (2013.01); *F21Y 2115/10* (2016.08)

(58) Field of Classification Search
CPC ... H04B 10/11; H04B 10/114; H04B 10/1143; H04B 10/1149; H04B 10/116
See application file for complete search history.

(56) References Cited

U.S. PATENT DOCUMENTS 3,696,384 A 10/1972 Lester
4,848,923 A 7/1989 Ziegler
(Continued)

FOREIGN PATENT DOCUMENTS

AU 2006201345 10/2007
AU 2007202909 2/2008
(Continued)

*Primary Examiner* — Daniel Dobson
(74) *Attorney, Agent, or Firm* — Vidas, Arrett & Steinkraus, P.A.

(57) ABSTRACT

An LED light fixture includes one or more optical transceivers that have a light support having a plurality of light emitting diodes and one or more photodetectors attached thereto, and a processor in communication with the light emitting diodes and the one or more photodetectors. The processor is constructed and arranged to generate a communication or data transfer signal.

18 Claims, 24 Drawing Sheets

Related U.S. Application Data continuation of application No. 14/207,955, filed on Mar. 13, 2014, now Pat. No. 9,100,124, and a continuation-in-part of application No. 13/427,358, filed on Mar. 22, 2012, now Pat. No. 8,744,267, which is a continuation of application No. 12/126,342, filed on May 23, 2008, now abandoned.

(60) Provisional application No. 61/778,672, filed on Mar. 13, 2013, provisional application No. 60/931,611, filed on May 24, 2007, provisional application No. 61/867,731, filed on Aug. 20, 2013, provisional application No. 61/927,663, filed on Jan. 15, 2014, provisional application No. 61/927,638, filed on Jan. 15, 2014.

(51) Int. Cl.

| | | |
|---|---|---|
| *H04B 10/40* | (2013.01) | |
| *H04B 10/114* | (2013.01) | |
| *H05B 37/02* | (2006.01) | |
| *F21K 9/20* | (2016.01) | |
| *F21V 3/04* | (2018.01) | |
| *F21V 5/04* | (2006.01) | |
| *F21V 23/00* | (2015.01) | |
| *H04B 10/50* | (2013.01) | |
| *H05B 33/08* | (2006.01) | |
| *H04J 14/00* | (2006.01) | |
| *F21Y 101/00* | (2016.01) | |
| *F21Y 115/10* | (2016.01) | |

(56) References Cited

U.S. PATENT DOCUMENTS

| | | |
|---|---|---|
| 5,062,152 A | 10/1991 | Faulkner |
| 5,099,346 A | 3/1992 | Lee |
| 5,247,380 A | 9/1993 | Lee |
| 5,495,358 A | 2/1996 | Bartig |
| 5,566,022 A | 10/1996 | Segev |
| 5,783,909 A | 7/1998 | Hochstein |
| 5,838,116 A | 11/1998 | Katyl |
| 6,081,304 A | 6/2000 | Kuriyama |
| 6,095,661 A | 8/2000 | Lebens |
| 6,102,696 A | 8/2000 | Osterwalder |
| 6,118,388 A | 9/2000 | Morrison |
| 6,159,005 A | 12/2000 | Herold |
| 6,177,678 B1 | 1/2001 | Brass |
| 6,183,100 B1 | 2/2001 | Suckow |
| 6,188,738 B1 | 2/2001 | Sakamoto |
| 6,271,815 B1 | 8/2001 | Yang |
| 6,377,558 B1 | 4/2002 | Dent |
| 6,426,599 B1 | 7/2002 | Leeb |
| 6,504,646 B1 | 1/2003 | Amoruso |
| 6,532,212 B1 | 3/2003 | Soloway |
| 6,819,654 B2 | 11/2004 | Soloway |
| 7,006,768 B1 | 2/2006 | Franklin |
| 7,178,941 B2 | 2/2007 | Roberge |
| 7,289,731 B2 | 10/2007 | Thinguldstad |
| 7,309,965 B2 | 12/2007 | Dowling |
| 7,321,757 B2 | 1/2008 | Yamashita |
| 7,323,991 B1 | 1/2008 | Eckert |
| 7,333,735 B1 | 2/2008 | Goorjian |
| 7,352,972 B2 | 4/2008 | Franklin |
| 7,439,874 B2 | 10/2008 | Sotiriou |
| 7,529,488 B2 | 5/2009 | Burdick |
| 7,548,698 B2 | 6/2009 | Yamamoto |
| 7,689,130 B2 | 3/2010 | Ashdown |
| 7,715,723 B2 | 5/2010 | Kagawa |
| 7,912,377 B2 | 3/2011 | Koga |
| 7,940,191 B2 | 5/2011 | Hierzer |
| 8,126,554 B2 | 2/2012 | Kane |
| 8,175,799 B1 | 5/2012 | Woehler |
| 8,188,878 B2 | 5/2012 | Pederson |
| 8,188,879 B2 | 5/2012 | Pederson |
| 8,207,821 B2 | 6/2012 | Roberge |
| 8,421,588 B1 | 4/2013 | Ross |
| 8,538,692 B2 | 9/2013 | Wurman |
| 8,547,036 B2 | 10/2013 | Tran |
| 8,571,411 B2 | 10/2013 | Pederson |
| 8,593,299 B2 | 11/2013 | Pederson |
| 8,687,965 B2 | 4/2014 | Pederson |
| 8,729,833 B2 | 5/2014 | Chemel |
| 8,744,267 B2 | 6/2014 | Pederson |
| 8,836,922 B1 | 9/2014 | Pennecot |
| 8,886,045 B2 | 11/2014 | Pederson |
| 8,890,773 B1 | 11/2014 | Pederson |
| 8,891,962 B2 | 11/2014 | Du |
| 8,902,076 B2 | 12/2014 | Pederson |
| 8,965,460 B1 | 2/2015 | Rao |
| 9,413,469 B2 | 8/2016 | Eden |
| 9,461,748 B2 * | 10/2016 | Pederson ............... H04B 10/40 |
| 2002/0109892 A1 | 8/2002 | Seto |
| 2002/0168958 A1 | 11/2002 | Ford |
| 2002/0181044 A1 | 12/2002 | Kuykendall, Jr. |
| 2003/0025608 A1 | 2/2003 | Pederson |
| 2003/0118216 A1 | 6/2003 | Goldberg |
| 2003/0156037 A1 | 8/2003 | Pederson |
| 2003/0169164 A1 | 9/2003 | Lau |
| 2003/0185340 A1 | 10/2003 | Frantz |
| 2003/0212996 A1 | 11/2003 | Wolzien |
| 2003/0222587 A1 * | 12/2003 | Dowling, Jr. ...... G06Q 30/0201 |
| | | 315/149 |
| 2004/0028349 A1 | 2/2004 | Nagasaka |
| 2004/0044709 A1 | 3/2004 | Cabrera |
| 2004/0101312 A1 | 5/2004 | Cabrera |
| 2004/0151344 A1 | 8/2004 | Farmer |
| 2004/0153229 A1 | 8/2004 | Gokturk |
| 2004/0208599 A1 | 10/2004 | Swartz |
| 2005/0002673 A1 | 1/2005 | Okano |
| 2005/0005794 A1 | 1/2005 | Inukai |
| 2005/0057941 A1 | 3/2005 | Pederson |
| 2005/0111533 A1 | 5/2005 | Berkman |
| 2005/0111700 A1 | 5/2005 | OBoyle |
| 2005/0128751 A1 | 6/2005 | Roberge |
| 2005/0169643 A1 | 8/2005 | Franklin |
| 2005/0231128 A1 | 10/2005 | Franklin |
| 2006/0012315 A1 | 1/2006 | McDonough |
| 2006/0039698 A1 | 2/2006 | Pautler |
| 2006/0056855 A1 | 3/2006 | Nakagawa |
| 2006/0132382 A1 | 6/2006 | Jannard |
| 2006/0149813 A1 | 7/2006 | Janik |
| 2006/0192672 A1 | 8/2006 | Gidge |
| 2006/0193634 A1 | 8/2006 | Wang |
| 2006/0213731 A1 | 9/2006 | Lesesky |
| 2006/0238368 A1 | 10/2006 | Pederson |
| 2006/0253598 A1 | 11/2006 | Nakamura |
| 2006/0262545 A1 | 11/2006 | Piepgras |
| 2006/0275040 A1 | 12/2006 | Franklin |
| 2007/0041732 A1 | 2/2007 | Oki |
| 2007/0104239 A1 | 5/2007 | Koga |
| 2007/0110446 A1 | 5/2007 | Hong |
| 2007/0145915 A1 | 6/2007 | Roberge |
| 2007/0147843 A1 | 6/2007 | Fujiwara |
| 2007/0160373 A1 * | 7/2007 | Biegelsen .......... H05B 37/0272 |
| | | 398/118 |
| 2007/0165244 A1 | 7/2007 | Yukhin |
| 2007/0195263 A1 | 8/2007 | Shimizu |
| 2007/0258718 A1 | 11/2007 | Furlong |
| 2007/0269219 A1 | 11/2007 | Teller |
| 2007/0285026 A1 | 12/2007 | Johler |
| 2007/0294029 A1 | 12/2007 | DAndrea |
| 2008/0044188 A1 | 2/2008 | Kagawa |
| 2008/0063404 A1 | 3/2008 | Broyde |
| 2008/0128505 A1 | 6/2008 | Challa |
| 2008/0138077 A1 | 6/2008 | Stretton |
| 2008/0154101 A1 | 6/2008 | Jain |
| 2008/0170536 A1 | 7/2008 | Marshack |
| 2008/0214219 A1 | 9/2008 | Matsushima |
| 2008/0227463 A1 | 9/2008 | Hizume |
| 2008/0292320 A1 | 11/2008 | Pederson |
| 2009/0002265 A1 | 1/2009 | Kitaoka |
| 2009/0102396 A1 | 4/2009 | Petrucci |

(56) References Cited

U.S. PATENT DOCUMENTS

| | | |
|---|---|---|
| 2009/0129782 A1 | 5/2009 | Pederson |
| 2009/0157545 A1 | 6/2009 | Mobley |
| 2009/0262760 A1 | 10/2009 | Krupkin |
| 2009/0315481 A1 | 12/2009 | Zhao |
| 2009/0315485 A1 | 12/2009 | Verfuerth |
| 2010/0060194 A1 | 3/2010 | Furry |
| 2010/0111538 A1 | 5/2010 | Arita |
| 2010/0142965 A1 | 6/2010 | Breyer |
| 2010/0209105 A1 | 8/2010 | Shin |
| 2011/0006898 A1 | 1/2011 | Kruest |
| 2011/0128384 A1 | 6/2011 | Tiscareno |
| 2011/0140612 A1 | 6/2011 | Mohan |
| 2011/0208963 A1 | 8/2011 | Soffer |
| 2011/0225611 A1 | 9/2011 | Shintani |
| 2011/0294465 A1 | 12/2011 | Inselberg |
| 2011/0305460 A1 | 12/2011 | Snyder |
| 2012/0202520 A1 | 8/2012 | George |
| 2012/0230696 A1 | 9/2012 | Pederson |
| 2012/0240196 A1 | 9/2012 | Bhagwat |
| 2012/0251100 A1 | 10/2012 | Rope |
| 2013/0015785 A1 | 1/2013 | Kamada |
| 2013/0094863 A1 | 4/2013 | Pederson |
| 2013/0201316 A1 | 8/2013 | Binder |
| 2013/0221848 A1 | 8/2013 | Miesak |
| 2013/0229346 A1 | 9/2013 | Jungbauer |
| 2013/0229492 A1 | 9/2013 | Ose |
| 2013/0341062 A1 | 12/2013 | Paquin |
| 2014/0153923 A1 | 6/2014 | Casaccia |
| 2014/0247907 A1 | 9/2014 | McCune |
| 2014/0286644 A1 | 9/2014 | Oshima |
| 2014/0341588 A1 | 11/2014 | Pederson |
| 2015/0078743 A1 | 3/2015 | Yang |
| 2017/0367164 A1 | 12/2017 | Engelen |

FOREIGN PATENT DOCUMENTS

| | | |
|---|---|---|
| EP | 1205763 | 5/2002 |
| FR | 2800500 | 5/2001 |
| GB | 2330679 | 4/1999 |
| JP | S63153166 | 6/1988 |
| NO | 2007003037 | 11/2007 |
| WO | 9935634 | 7/1999 |
| WO | 9942985 | 8/1999 |

\* cited by examiner

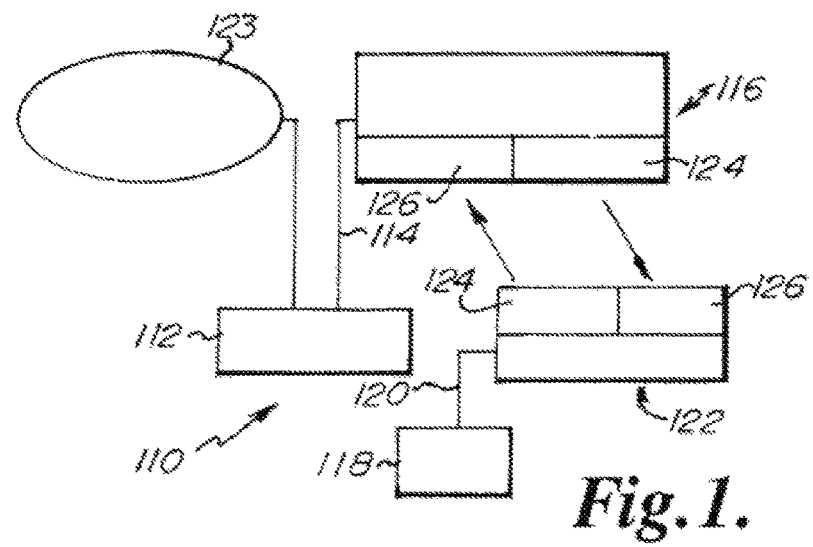
Fig.1.
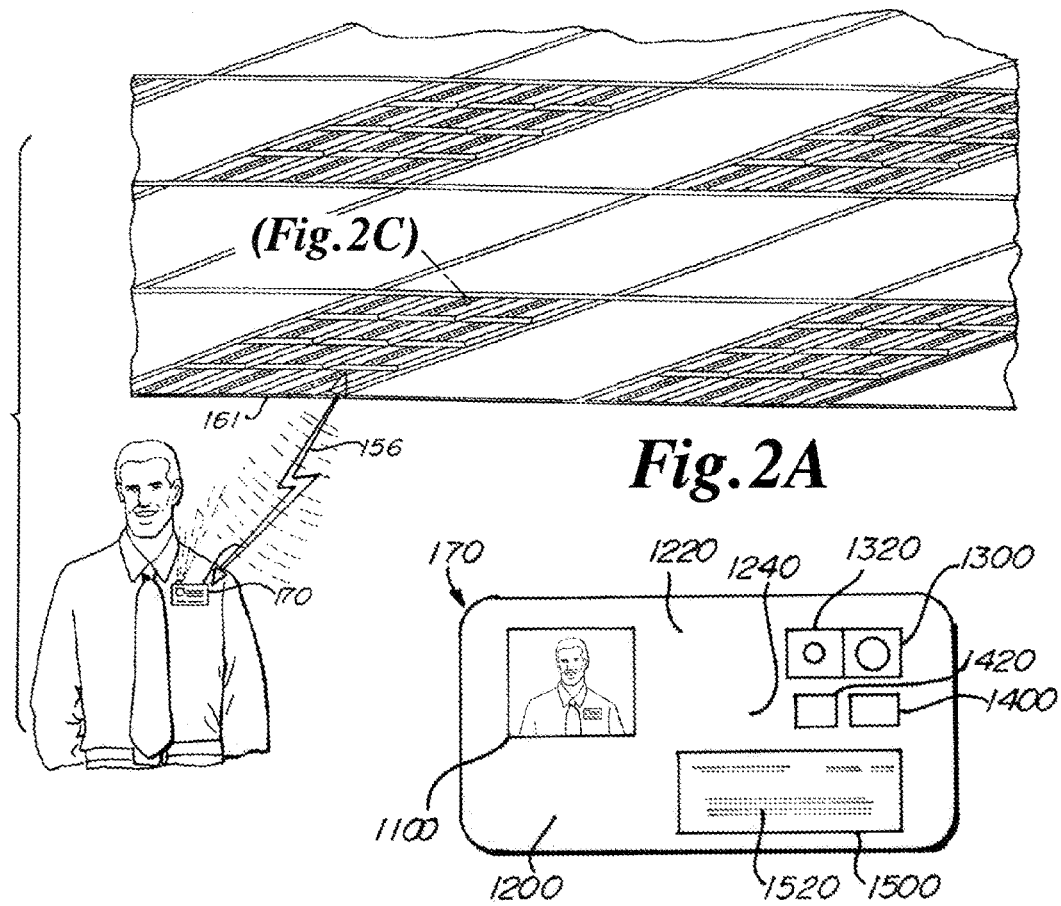
Fig.2A
Fig.2B

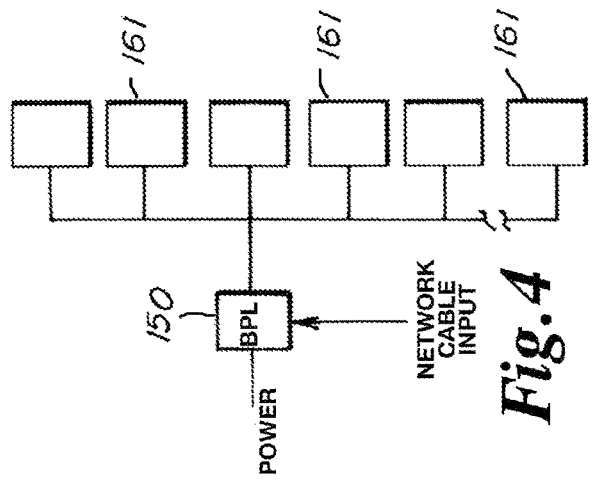
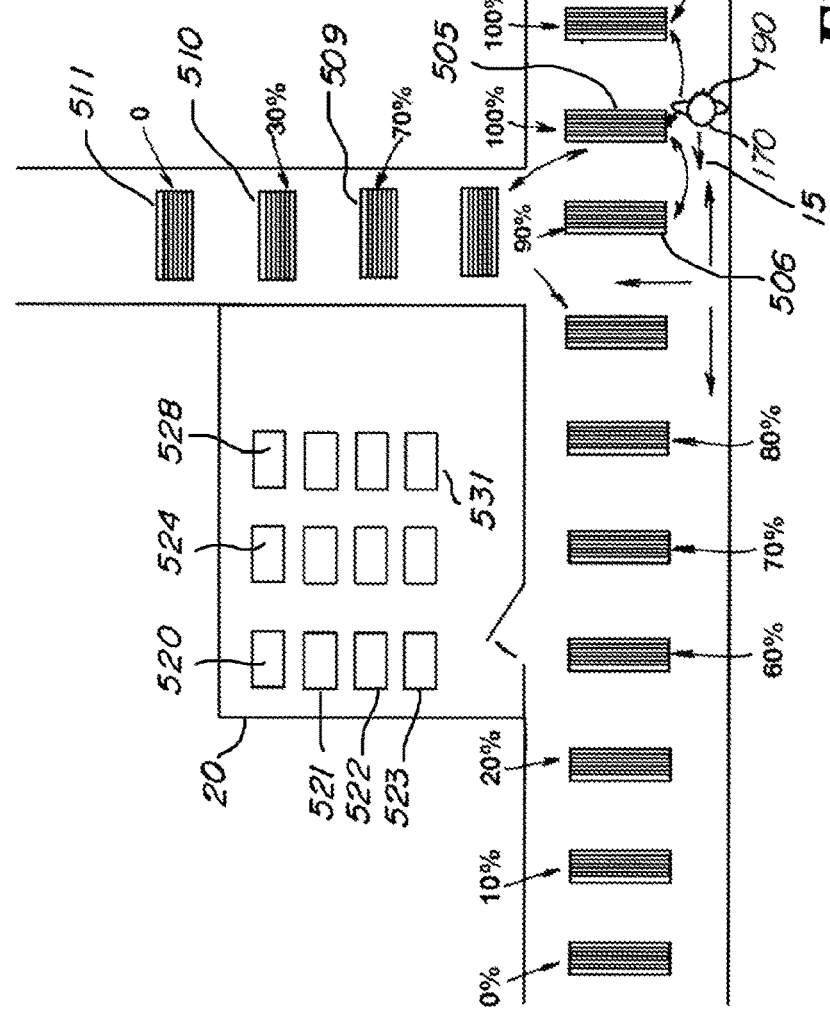

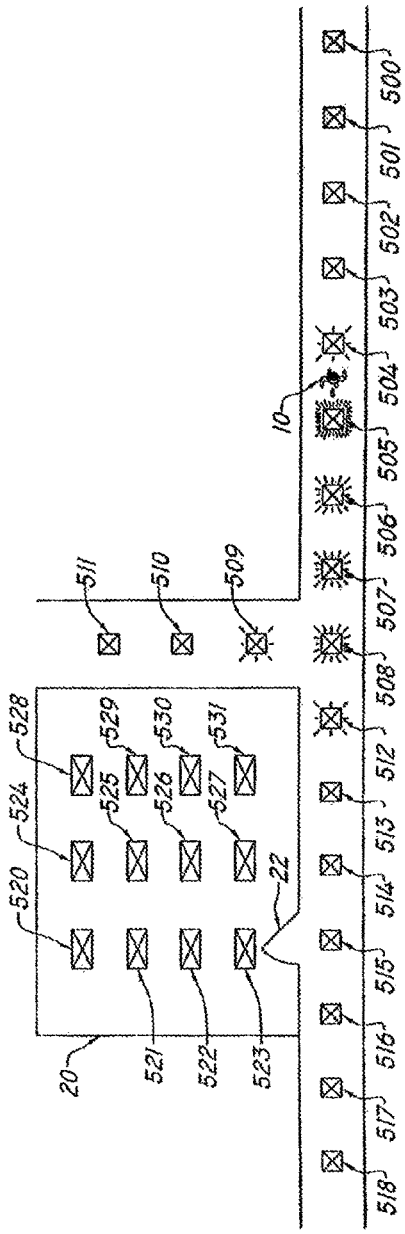
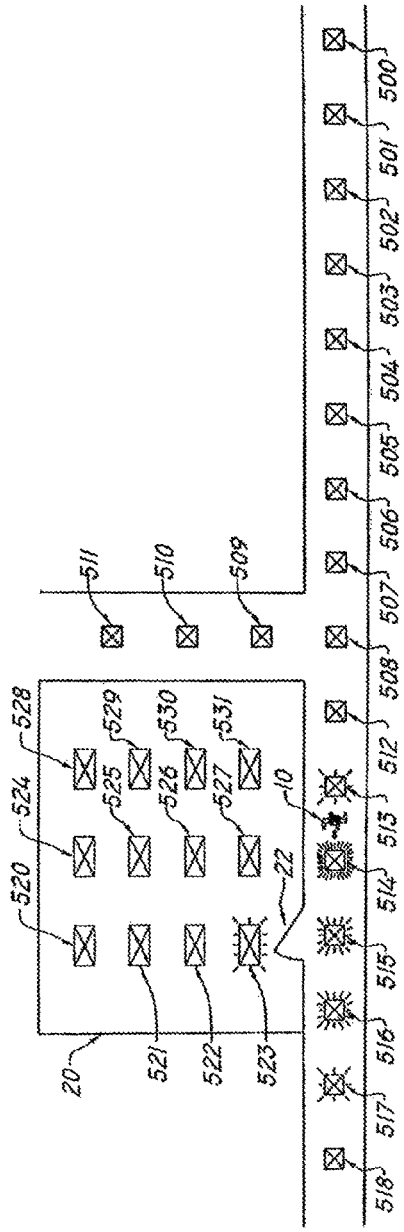
Fig. 8
Fig. 9

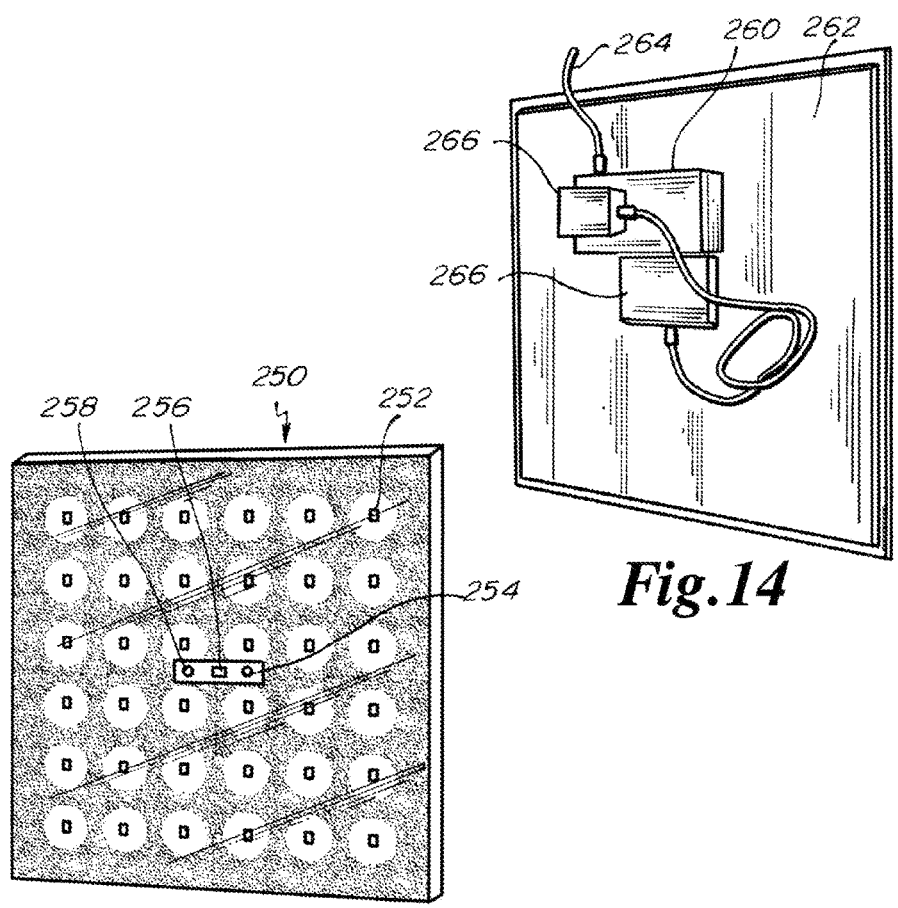
Fig.13
Fig.14
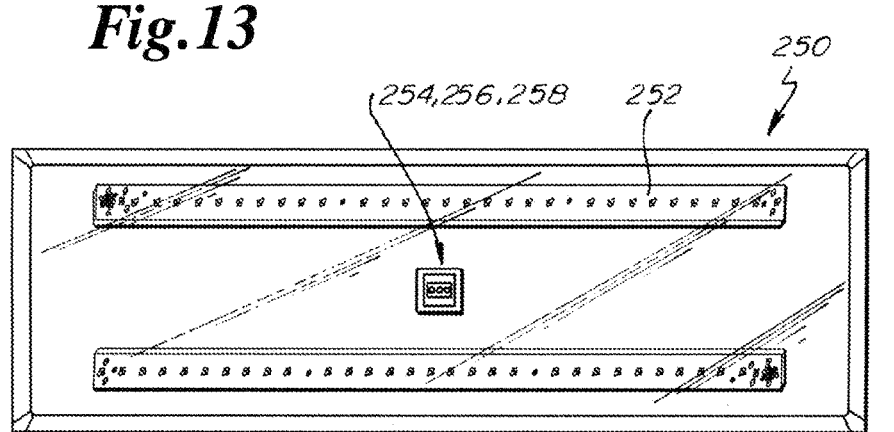
Fig.15

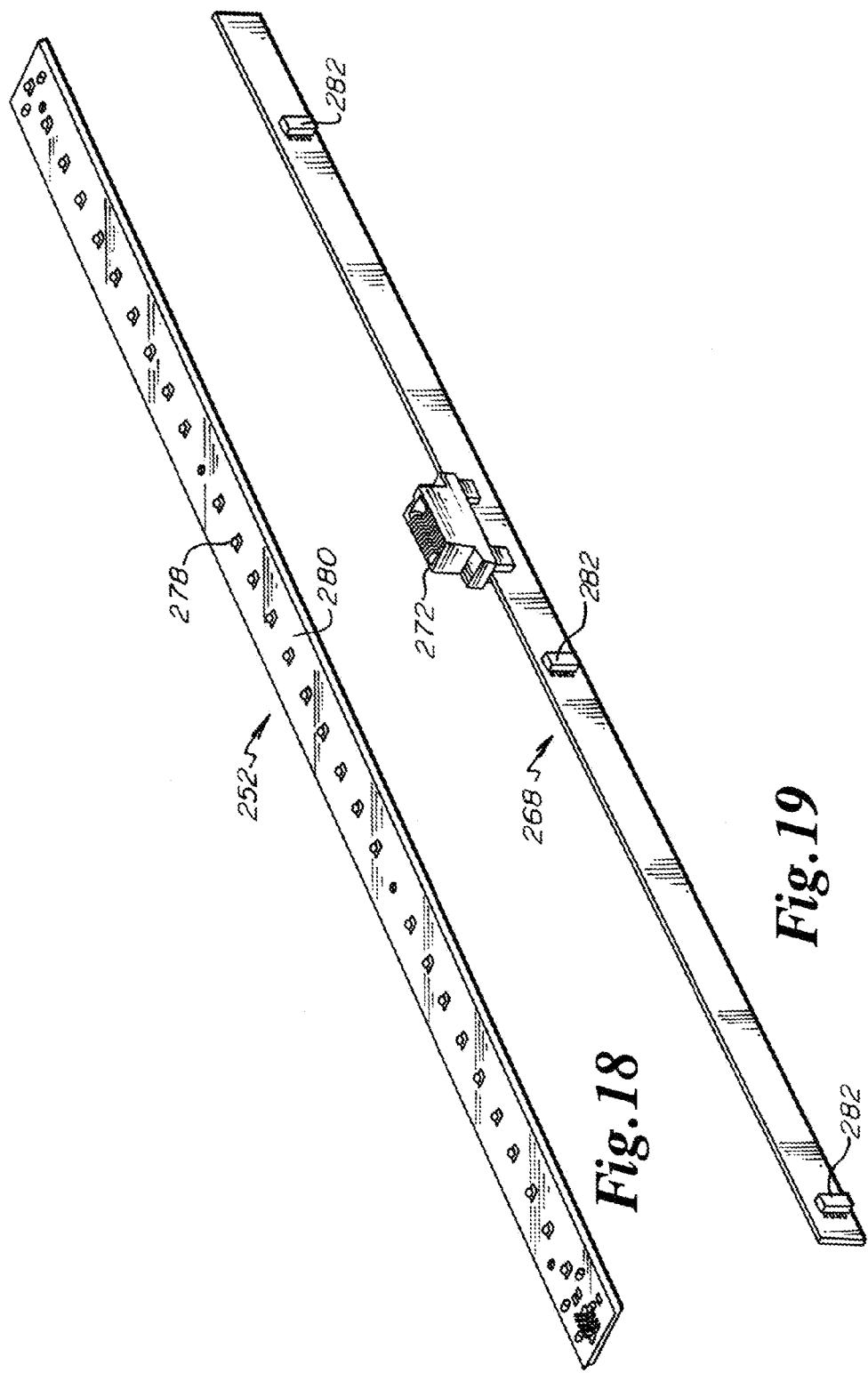

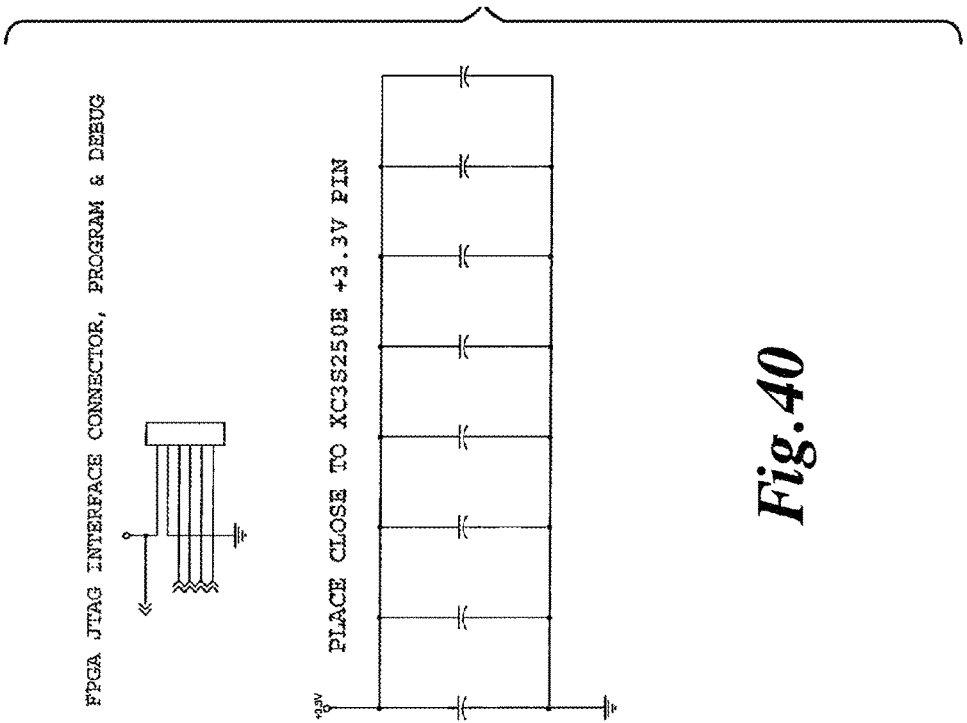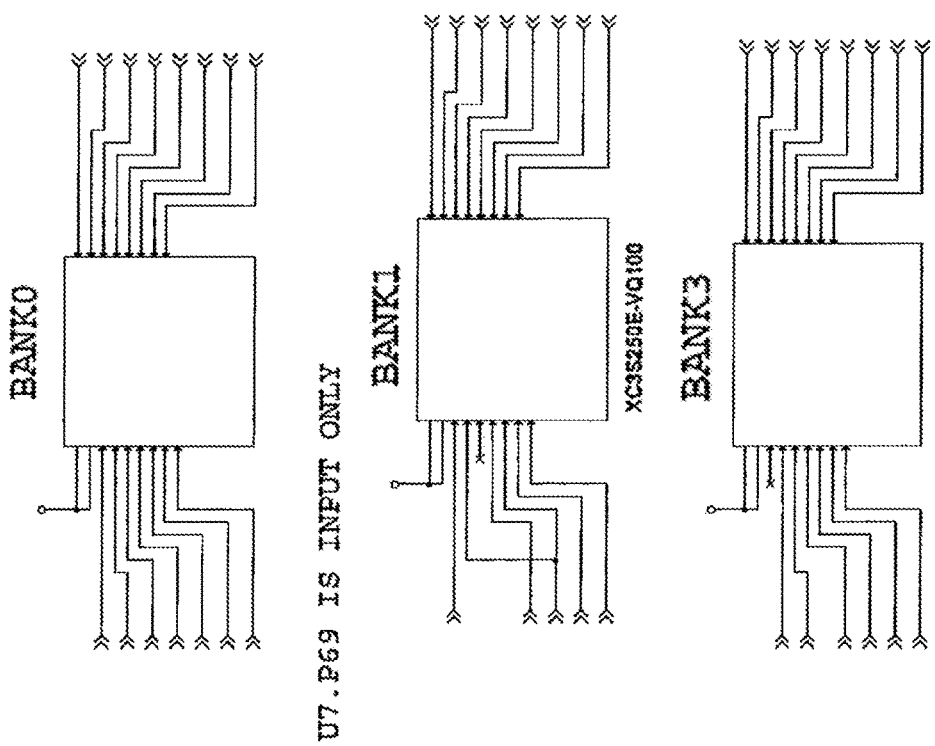
Fig. 40

LED LIGHT FIXTURE

CROSS-REFERENCE TO RELATED APPLICATIONS

This application is a continuation of application Ser. No. 14/817,411, filed Aug. 4, 2015, now U.S. Pat. No. 9,461,748, issued Oct. 4, 2016, which is a continuation of application Ser. No. 14/207,955, filed Mar. 13, 2014, now U.S. Pat. No. 9,100,124, issued Aug. 4, 2015, which claims the benefit of provisional patent application No. 61/778,672, filed Mar. 13, 2013. This application is also a continuation-in-part of application Ser. No. 13/427,358, filed Mar. 22, 2012, now U.S. Pat. No. 8,744,267, issued Jun. 3, 2014, which is a continuation of application Ser. No. 12/126,342, filed May 23, 2008, now abandoned, which claims priority to provisional patent application No. 60/931,611, filed May 24, 2007, the disclosure of which is expressly incorporated herein by reference. This application also claims the benefit of provisional patent application No. 61/867,731, filed Aug. 20, 2013, the disclosure of which is expressly incorporated herein by reference. This application also claims the benefit of provisional patent application No. 61/927,663, filed Jan. 15, 2014, the disclosure of which is expressly incorporated herein by reference. This application also claims the benefit of provisional patent application No. 61/927,638, filed Jan. 15, 2014, the disclosure of which is expressly incorporated herein by reference.

STATEMENT REGARDING FEDERALLY SPONSORED RESEARCH

Not Applicable

FIELD OF THE INVENTION

In some embodiments, the present invention is generally directed to light emitting diodes (LEDs) and applications thereof. In particular, some embodiments of the present invention are directed to using LEDs and power line communication technology to provide internet access and communication capability to residential and commercial clientele.

BACKGROUND OF THE INVENTION

Radiofrequency transmissions may be easily intercepted, in part because of the fact that RF signals are designed to radiate signals in all directions. Radiofrequency transmissions are also regulated by the Federal Communications Commission (FCC) which controls the frequencies that may be used by individuals. Radiofrequency transmissions are also susceptible to interference and produce noise.

In contrast to RF communications, light sources used for communication are extremely secure due to the fact that they are focused within a narrow beam, requiring placement of equipment within the beam itself for interception. Also, because the visible spectrum is not regulated by the FCC, light sources can be used for communications purposes without the need of a license. Light sources are also not susceptible to interference nor do they produce noise that can interfere with other devices.

Light emitting diodes (LEDs) may be used as light sources for data transmission, as described in U.S. Pat. Nos. 6,879,263 and 7,046,160, the entire contents of each being expressly incorporated herein by reference. LEDs have a quick response to "ON" and "OFF" signals, as compared to the longer warm-up and response times associated with fluorescent lighting, for example. LEDs are also efficient in producing light, as measured in lumens per watt. LED technology provides a practical opportunity to combine lighting and communication. This combination of lighting and communication allows ubiquitous light sources such as street lights, home lighting, and office building lighting, for example, to be converted to, or supplemented with, LED technology to provide for communications while simultaneously producing light for illumination purposes.

Regarding office buildings, building management is a complex science which incorporates and governs all facets of human, mechanical and structural systems associated with buildings. As a result of the complexity, most commercial buildings are managed by commercial property management companies with great expertise. Both at the time of construction and throughout the life-cycle of a building, the interrelationships between people and the mechanical and structural systems are most desirably evaluated.

Building management includes diverse facets, some which are simply representations of the building and associated systems and people, and other facets which are tangible. Exemplary of representations are accounting or financial monitoring responsibilities which will including record keeping control and assurance of financial transactions involving tenants, owners, and service providers. Exemplary of the physical or tangible responsibilities are physical development and maintenance, including identification of need for features, improvements, maintenance and the assurance of the execution of the same.

One very important area associated with building management is lighting or illumination. While often perceived as a simple task of providing lights, this seemingly simple task has much research and science behind a well-designed lighting system. This is because safety, productivity and general well-being of occupants depend heavily on proper lighting.

Many factors need considered at the time of construction or remodeling to facilitate proper lighting design. Intended usage of a space is important in illumination design consideration, since this will dictate necessary illumination levels, times and duration of use, and anticipated cycling of the illumination.

Nearly all public buildings rely on a great many lamps positioned throughout the interior of the building, such as along hall corridors and in each room, and also about the exterior. These lights have historically been activated manually. Architects are commonly employed to assist not only with a floor plan of physical spaces, but also with the proper selection and layout of lighting to best complement the floor plan and usage of each space within a building. As may be appreciated, illumination of a space is determined at the time of production of blueprints, in anticipation of construction. The illumination that has been chosen for a space is essentially fixed during building construction.

Another very important consideration associated with building management is energy management. The concern for energy management is driven by the expense associated with energy consumed over the life of a building. Energy management is quite challenging to design into a building, because many human variables come into play within different areas within a building structure. For example, one occupant may require full illumination for that occupant to operate efficiently or safely within a space, while a second occupant might only require a small amount or local area of illumination. Further complicating the matter of energy management is the fact that many commercial establishments may have rates based upon peak usage. A business with a large number of lights that are controlled with a common switch may have peak demands large relative to total consumption of power, simply due to the relatively large amount of power that will rush in to the circuit. Additionally, during momentary or short-term power outages, the start-up of electrical devices by the power company is known to cause many problems, sometimes harming either customer equipment or power company devices. Control over inrush current is therefore very desirable, and not economically viable in the prior art.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. § 1.56(a) exists.

All U.S. patents and applications and all other published documents mentioned anywhere in this application are incorporated herein by reference in their entirety.

Without limiting the scope of the invention, a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided for the purposes of complying with 37 C.F.R. § 1.72.

GENERAL DESCRIPTION OF THE INVENTION

According to the invention, there is provided a light emitting diode (LED) light and systematic information transfer through encrypted pulsed light communication system which may be depicted in several embodiments. In general, the LED light and pulsed light communication system or visible light embedded communication system (VLEC) may be formed of a single row, single source, or an array of light emitting diode light sources configured on a light support and in electrical communication with a controller and a power supply, battery, or other electrical source.

The LED light and VLEC system may provide various light signals, colored light signals, or combination or patterns of light signals for use in association with the communication of information. These light signals may also be encoded. The LED light and VLEC system may be electrically coupled to a controller used to modulate, pulse, or encode, the light generated from the light sources to provide for illumination and to transmit messages.

Individual light supports/fixtures as a portion of the communication system may be positioned adjacent to, and/or be in electrical communication with another light support/fixture, through the use of suitable electrical connections. Alternatively, individual light supports/fixtures may be in communication with each other exclusively through the transmission and receipt of pulsed light signals.

A plurality of light supports or solitary light sources may be electrically coupled in either a parallel or series manner to a controller which in some embodiments may be referred to as a Charlie unit. The controller is also preferably in electrical communication with the power supply and the LED's, to regulate or modulate the light intensity for the LED light sources. The individual LED's and/or arrays of LED's may be used for transmission of communication packets formed of light signals. The controller for the LED light support may generate and/or recognize pulsed light signals used to communicate information. The LED light VLEC system may also include a receptor which may be a photodetector or photodiode coupled to the controller, where the receptor is constructed and arranged for receipt of pulsed LED light signals for conversion to digital information, and for transfer of the digital information to the controller for analysis and interpretation. The controller may then issue a light signal or other communication signal to an individual to communicate the content of received information transmitted via a pulsed LED light VLEC system.

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

BRIEF DESCRIPTION OF THE DRAWINGS

FIG. 1 is a block diagram of one embodiment of the Communication System.

FIG. 2A is an environmental view of an alternative embodiment of the Communication System.

FIG. 2B is a detailed view of a name tag in an exemplary embodiment of the present invention.

FIG. 4 is a block diagram of an alternative embodiment of the Communication System.

FIG. 5 is a block diagram of an alternative embodiment of the Communication System.

FIG. 8 is a block diagram of an alternative embodiment of the LED Communication System, depicting an energy management scheme.

FIG. 9 is a block diagram of an alternative embodiment of the LED Communication System, depicting an energy management scheme.

FIG. 13 is a front environmental view of one alternative embodiment of an LED light fixture.

FIG. 14 is a rear environmental view of one alternative embodiment of the LED light fixture depicted in FIG. 13.

FIG. 15 is a front environmental view of one alternative embodiment of an LED light fixture.

FIG. 18 is a detail isometric view of one alternative embodiment of an LED light unit.

FIG. 19 is a detail isometric view of one alternative embodiment of a power distribution interconnect device.

FIG. 40 is a partial electrical schematic of one alternative embodiment of an LED light fixture.

DETAILED DESCRIPTION OF THE PREFERRED EMBODIMENTS

Figure 2C:
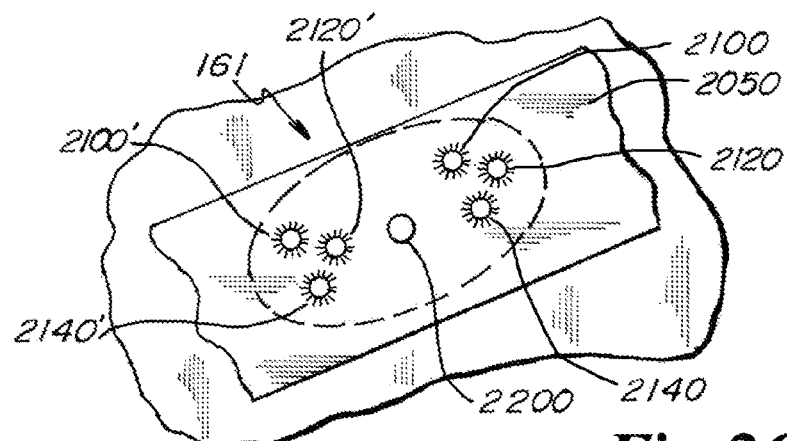
FIG. 2C is a detailed view of an LED light source in any exemplary embodiment of the present invention.

While this invention may be embodied in many different forms, there are described in detail herein specific preferred embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

In each of the embodiments discussed below, the LEDs may be formed of the same or different colors. The controller may be configured to select the color of the LEDs to be illuminated forming the observed light.

FIG. 1 depicts an exemplary embodiment 110 of an LED light VLEC system. FIG. 1 shows a server PC 112 connected via a USB cable 114 to a server optical transceiver (XCVR) 116, and a client PC 118 is connected via a USB cable 120 to a client optical transceiver 122. The server PC 112 is in communication with a network 123 via a CAT-5 cable, for example. The server optical XCVR and the client optical XCVR are substantially similar in at least one embodiment. An exemplary optical XCVR (or, simply, "XCVR") circuit includes one or more LEDs 124 for transmission of light and one or more photodetectors 126 for receiving transmitted light. The term "photodetector" includes "photodiodes" and all other devices capable of converting light into current or voltage. The terms photodetector and photodiode are used interchangeably hereafter. The use of the term photodiode is not intended to restrict embodiments of the invention from using alternative photodetectors that are not specifically mentioned herein.

In at least one embodiment, the XCVR circuit may include an RS232 to USB conversion module. The transmit pin on the USB conversion module drives the driver electronics for the LEDs 124. In some embodiments, the XCVR circuit includes high intensity LEDs. In some embodiments it may be desirable to use high intensity LEDs to enhance lighting, to improve data transmission, or both. In at least one embodiment, a 12 volt DC, 3 amp power supply is sufficient for powering an array of high intensity LEDs 124.

In some embodiments, the XCVR circuit further includes an amplifier for amplifying the optical signal received by the photodiode. The output of the amplifier may be fed into level shifting circuitry to raise the signal to TTL levels, for example. The signal is then fed into the receive pin of the RS232 to USB module.

In some embodiments, a 9V battery can be used to power the amplifier circuitry. Significant noise is generated by switching high brightness LEDs on and off at 200 mA and 500 kbps, for example. Powering the amplifier with a battery can reduce these noise problems by reducing or removing transients.

It should be noted that in some embodiments, the LED can both emit and receive light. In such an embodiment, the LED can act both as a transmitter or receiver. More information on such bi-directional LEDs can be found in U.S. Pat. No. 7,072,587, the entire contents of which are expressly incorporated herein by reference.

In at least one embodiment, the optical XCVRs, or circuitry attached thereto, include modulation circuitry for modulating a carrier signal with the optical signal. Modulation can be used to eliminate bias conditions caused by sunlight or other interfering light sources. Digital modulation can be accomplished by using phase-shift keying, amplitude-shift keying, frequency-shift keying, quadrature modulation, or any other digital modulation technique known by those of ordinary skill. Similarly, such XCVRs can include demodulation circuitry that extracts the data from the received signal. Modulation and demodulation techniques for modulating light signals are described in U.S. Pat. Nos. 4,732,310, 5,245,681, and 6,137,613, the entire contents of each being expressly incorporated herein by reference.

It may be desirable in some embodiments to further include filters or filter circuitry to prevent unwanted light from being amplified. For example, the optical baseband signal can be modulated at 100 kHz and then transmitted. The XCVR that receives the 100 kHz modulated signal can include a filter stage centered at 100 kHz. The filtered 100 kHz signal can then be input into the amplifier circuitry, thereby preventing amplification of unwanted signals. In some embodiments, it can be desirable to amplify the transmitted signal first, and then filter out the baseband signal.

Additional information regarding data communication can be found in International Publication Number WO 99/49435, the entire contents of which are expressly incorporated herein by reference.

In another embodiment of the present invention, security badges, ID badges, communications badge, badge, or name tags, these terms being used interchangeably hereafter, can include optical XCVRs, as shown in FIG. 2A. The optical XCVR of a user's security badge 170 communicates with the optical XCVRs that are also acting as room lighting, hall lighting, or other lighting 161 in a customer's facility, as shown in FIG. 2A. Of course, the optical XCVRs can be placed in numerous other locations as lighting sources. Using the XCVRs as light sources can reduce energy consumption and simplify communications by reducing the filtering or modulation complexities necessary to distinguish data signals from extraneous lighting sources. As shown in FIG. 2A, a user is shown with a name tag 170 that is broadcasting and receiving data over an optical link 156 using the XCVR described in FIG. 2A to a ceiling mounted fixture. Badge 170 is pinned to, affixed with or otherwise transported by a person, in the embodiment as illustrated as a replacement for standard security identification badges.

Badge 170 is illustrated in greater detail in FIG. 2B, and may include features commonly found in standard security identification badges, including but not limited to such attributes as a photograph 1100 of the person assigned to the badge, and indicia such as employee identification or number 1200, name 1220, and business or entity logos 1240. Business or entity logos 1240, or other components may integrate anti-counterfeiting technology as may be available or known for such diverse applications as passports, driver's licenses, currency and other applications. Commonly used devices include holograms, watermarks, special materials or unique threads, and embedded non-alterable electronic, visible, sonic or other identification codes. An optical transmitter 1300 and receiver 1320 are most preferably provided and enable communication over optical communications channel 156. A microphone, loudspeaker, microphone and speaker combination, or dual-purpose device 1400 may be provided to integrate an auditory communication channel between communication badge 170 and nearby living beings or other animate or inanimate objects. A video camera 1420 may be incorporated to capture video or still pictures. A video display 1500 may additionally be incorporated into communication badge 170, permitting information 1520 to be displayed thereon, which could for exemplary purposes could comprise either text or graphics.

In some embodiments, indicia such as employee identification or number 1200, name 1220, and business or entity logos 1240 may also be provided either as illustrated in FIG. 2B, or in another embodiment solely upon video display 1500.

In some embodiments, biometric detectors and systems may be employed within or in association with communication badge 170. For exemplary purposes, but not limited solely thereto, a fingerprint reader or other biometric detector may be incorporated within badge 170.

Communication badge 170 communicates with XCVR in LED light source 161. LED light source 161, illustrated by magnified view in FIG. 2C as a body 2050 that incorporates at least one, and preferably a plurality of LEDs and optical detectors. One or more photodetectors 2200 may be provided, and may either be broad spectrum detectors or alternatively color-filtered or sensitive to only a single color. The detector will be any of the myriad known in the art, the particular selection which will be determined by well-known considerations such as sensitivity, reliability, availability, cost and the like.

As illustrated, LEDs may be in clusters of three. In accord with the present invention, these LEDs are RGB LEDs, designating that they include red, blue and green which are the primary additive colors from which all other colors including white may be produced. LEDs 2100-2140 may be discrete components, or may alternatively be integrated onto a common die and take the physical form of a single LED. Furthermore, more than one RGB LED may be integrated upon a single die or within a common package, as may be deemed most appropriate by a manufacturer. A plurality of RGB LEDs may also be provided upon or within a single body 2050, as illustrated in FIG. 2C by RGB LEDs 2100', 2120' and 2140'. In practice, there is no limit to the number of RGB LEDs that may be used, other than physical size and available space limitations, and thermal dissipation capacity and power requirement constraints.

By controlling the relative power applied to each one of the RGB LEDs 2100-2140, different colors may be produced.

Through the use of RGB LEDs, color temperature of an LED light panel 2000 may be adjusted or controlled, and may be varied in real time without making any hardware or apparatus changes. Instead, power applied to the RGB LEDs is adjusted to favor one or another of the RGB LEDs 2100-2140. Since the light emitted from the RGB LEDs is approximately full-spectrum light, the color-rendering index may also be relatively high, particularly when compared to mercury or sodium vapor lamps, making the light feel very natural.

For the purposes of the present invention, where an optical communications channel 156 is created between XCVR and one or more communications badges 170, higher data transfer rates may be obtained with more rapid control of illumination levels. Consequently, if phosphors are used in the generation of light from LED light source 161, and if faster data exchange rates through optical communications channel 156 are desired, these phosphors will preferably be very fast lighting and extinguishing.

A variety of physical and electrical configurations are contemplated herein for LED light source 161. As illustrated in FIG. 2A, light source 161 may replace a standard fluorescent tube light fixture. This can be accomplished by replacing the entire fixture such that ballasts and other devices specific to fluorescent lighting are replaced. In many cases, this will be the preferred approach. The fixture may then be wired for any suitable or desired voltage, and where a voltage or current different from standard line voltage is used, transformers, power converters or power supplies may be provided. When a building is either initially being constructed, or so thoroughly remodeled to provide adequate replacement of wires, the voltage may be generated in transformers that may even be provided outside of the occupied space, such as on the roof, in a utility room, basement or attic. In addition to other benefits, placement in these locations will further reduce requirements for air conditioning.

As efficiencies of light generation by LEDs are now beginning to surpass fluorescent tubes, such entire replacement is more economical. However, total replacement of such fixtures is not the only means contemplated herein. Any lesser degree of replacement is also considered in alternative embodiments. For exemplary purposes, the physical reflectors commonly associated with fluorescent fixtures may be preserved, and the fixture simply rewired to bypass any ballasts or starter circuitry that might be present. In this case, line voltage, such as 120 VAC at 60 Hertz in the United States, may pass through the electrical connector pins. LED base 2050, in such case, may be designed to insert directly into a standard fluorescent socket, such as, for exemplary purposes only and not limited thereto, the standard T8 and T12 sockets used in the United States. In such case, either RGB LEDs 2100-2140 are arranged and wired to directly operate from line voltage, or appropriate electronics will need to be provided directly in LED base 2050 to provide necessary power conversion. In yet another conceived alternative embodiment, power conversion may be provided through switching-type or other power conversion circuitry to alleviate the need for any rewiring, though in these instances the power conversion circuitry will need to accommodate the particular type of ballast already in place.

Where other types of fixtures already exist, such as standard incandescent Edison screw bases, LED bulbs may similarly accommodate the fixture. For incandescent replacement, no rewiring or removal of ballasts is required, since line voltage is applied directly to incandescent fixtures. Consequently, appropriate conversion may in one conceived alternative embodiment simply involve the replacement of a bulb with no fixture or wiring alterations.

For LED light source 161 to replace an existing bulb, regardless of type, and benefit from the many features enabled in the preferred embodiment, communications circuitry must also be provided. This communications circuitry is necessary to properly illuminate each of the red, green and blue LEDs to desired color, to transport data through optical communication channel 156.

In accord with a preferred method of the invention, LEDs are used to transmit through optical communication channel several kinds of data, including identity, location, audio and video information. The use of an optical communications link provides large available bandwidth, which in turn permits multiple feeds of personal communication between LED light sources and electronic devices similar to or in excess of that of cell phones. The optical data is transferred at rates far in excess of those detectable by the human eye, and so a person is not able to detect any visible changes in illumination as the data is being transferred. Additionally, because optical illumination is constrained by opaque objects such as walls, the location of a VLEC/XCVR device and associated person can be discerned to a particular room, hallway or other similar space.

In contrast, prior art GPS systems and cell phone triangulation techniques are typically only accurate to one or several hundred feet. Horizontally, this prior art precision is adequate for many applications. However, vertically several hundred feet could encompass twenty floors in an office or apartment building. The preferred embodiment, capable of precision to a room or light fixture, therefore has much more exact pinpointing than hitherto available. It can locate a person immediately, even in a large area and/or among a large crowd, and can keep track of a large population simultaneously. As noted, the large bandwidth permits video signals to be integrated with VLEC/XCVR location and movement, providing the opportunity to create audio-video records that are fixed in time and location.

Since location may be relatively precisely discerned, optical transmitter 1300 or LEDs 2100-2140 of FIG. 2B may in one embodiment be configured to change color, flash, or otherwise be visually changed or manipulated to assist with directional guidance, personnel or intruder identification, energy management, or to facilitate the meeting and connection of individuals. To achieve these objectives, a building needs to be wired only for lights, saving a significant expense on infrastructure of other wires and fixtures.

Figure 3:
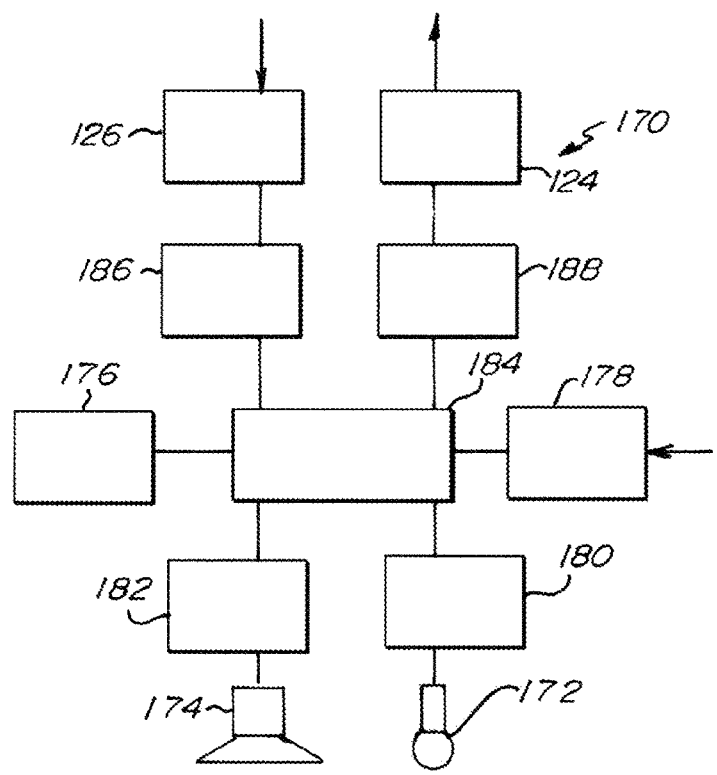
FIG. 3 is a block diagram of an alternative embodiment of the Communication System.

Some embodiments of the name tag 170 XCVR include any or all of the following devices: a microphone 172, a speaker 174, a rechargeable battery 176, and a video camera 178, as shown in the simplified block diagram of FIG. 3. In at least one embodiment, the microphone 172 is in communication with an analog-to-digital converter (ADC) (not shown) for converting the analog speech input to a digital signal. An amplifier circuit 180 can be used to boost the microphone signal. The signal can be amplified prior to or after the ADC. In some embodiments, the speaker is communication with a digital-to-analog converter (DAC) (not shown) for converting the received digital signal to an analog output. An amplifier circuit 182 can be used to boost the speaker signal. The signal can be amplified prior to or after the DAC. The processor 184 shown in FIG. 3 converts the digital signals from the microphone/amplifier to data packets that can be used for transmission by the optical XCVR. Similarly, the processor converts the data packets received by the optical XCVR to audio out signals directed to the speaker. The processor 184 can convert data packets received from or directed to the video camera.

In such an embodiment, the user can use the name tag 170 as a communication device. Alternatively, the user may use the name tag 170 to stream music, or video if a display is included. Furthermore, the optical XCVR can also include non-volatile memory (FLASHRAM, EEPROM, and EPROM, for example) that can store firmware for the optical XCVR, as well as text information, audio signals, video signals, contact information for other users, etc., as is common with current cell phones. While a hard-drive may be used instead of these semiconductor-based memory devices, hard-drives may be impractical in some embodiments based on their size, access times, as well as their susceptibility to jarring.

The optical XCVR includes one or more photodetectors 126 for receiving transmitted LED or other light signals, and one or more LEDs 124 for transmitting LED signals, as shown in FIG. 3. In some embodiments, an optical signal amplifier 186 is in communication with the photodetectors 126 to increase the signal strength of the received light signals. In at least one embodiment, the LEDs are in operative communication with an LED power driver 188, ensuring a constant current source for the LEDs.

In some embodiments, the name tag 170 or VLEC/XCVR system or device may include circuitry that performs modulation, demodulation, data compression, data decompression, up converting, down converting, coding, interleaving, pulse shaping, and other communication and signal processing techniques, as are known by those of ordinary skill in the art.

In at least one embodiment, the name tag 170 or VLEC/XCVR device or fixture is embedded with a unique code, similar in principle to the MAC address of a computer, for example. Thus, every name tag 170 VLEC/XCVR or fixture device has a unique identifier. The name tag 170 or VLEC/XCVR device or fixture broadcasts the unique code at regular intervals, or irregular intervals if desired. Optical XCVRs located within the user's building and near the user can then receive the unique code transmitted by the name tag 170 or VLEC/XCVR device or fixture.

There are numerous applications of such a design. For example, in some embodiments, an optical XCVR is engaged to a door lock. When a user with a name tag 170 approaches a locked door, the name tag 170 broadcasts the unique code, and an optical XCVR in communication with the door lock receives the code, and if acceptable, unlocks or opens the door. A table of acceptable codes may be stored in a memory device that is in communication with, and accessible by, the door's optical XCVR. Alternatively, the door's optical XCVR may transmit a code to a central station which compares the user's code against a table of approved codes and then sends a response either allowing or denying access.

As seen in FIG. 4, the electrical wiring in the hallways and/or rooms may include Broadband Over Power Line BOPL. As such, the name tag 170 or VLEC/XCVR device or fixture may be used to provide access to the Internet via the optical XCVRs in the hallways and rooms. A person walking down the hallway may receive a phone call on their name tag 170 or through a VLEC/XCVR device or fixture from a person on the other side of the world as long as the other person was using the Internet to communicate and knew the unique code of the name tag 170 or through a VLEC/XCVR device or fixture. Such communication is possible because the Internet is based upon transmission of packetized data, a form ideally suited for use with an optical XCVR.

FIG. 4 illustrates a simplified block schematic diagram of an electrical circuit used to couple power and data to one or a plurality of LED light sources 161. Power, which may be either AC or DC current is coupled through a power line bridge 150 with data from a network cable input, for example. The source of the data is not critical to the operation of the present invention, but may include various computer outputs such as might, for exemplary purposes, include control processor output or network connections such as commonly found on Local Area Networks (LAN), Wide Area Networks (WAN) or through the Internet. In accord with one embodiment, the wiring between power line bridge 150 and LED light source 161 is shielded by passing through a conduit or the like, defining a Shielded Broadband-over-Power-Line (S-BPL) connection that is both resistant to interfering communications and also produces almost no radiant energy.

In at least one embodiment, the name tag 170 or VLEC/XCVR device or fixture may be used in conjunction with the LED lighting in hallways, rooms, etc. to reduce energy consumption, as shown in FIG. 5. For example, all the lights in a hallway may have a standby setting such that they are relatively dim or even off. As a person with a name tag 170 proceeds down a hallway, the lights in front of the person turn on in response to a transmitted signal (e.g. the unique code of the name tag). As the person moves beyond a light, the light returns to its standby setting of dim/off brightness through a signal communicated from a XCVR at a sufficiently remote location to indicate that the individual has passed, and is no longer present at this particular location. The presence of an individual proximate to an XCVR may be determined by either recognition of a signal or through the failure to continue to recognize a signal, or by a proximity calculation as based on a controller receiving a signal from a remote location which indicates recognition of a name tag 170. A proximity is then calculated where initial or previous XCVR light sources are extinguished as an individual passes a particular location. In other embodiments, the lights can gradually become brighter, as a percentage of full brightness, as a person approaches, and then gradually dim, as a percentage of full brightness, as a person moves away based on proximity calculation as earlier described.

The lights shown in FIG. 5, in accordance with an embodiment of the invention, will have AC wiring with data carriers such as S-BPL, and static locations encoded into the system. Thus a person 190 entering a hallway 192 with a communications badge 170 could use only those lights needed for his travel. As the person 190 progresses toward a destination, the lights behind may be no longer needed and so may be programmed to turn off These lights could function variably from 10 to 100% as needed, for example. As shown in FIG. 5, the person 190 is approximately adjacent to light 505 and traveling in the direction shown by arrow 15 towards light 506. From this position, person 190 might prefer to be able to see into the branching corridor containing lights 509-511. With appropriate central computer control and programming which will be readily understood and achieved by those skilled in the computer arts, the illumination of these neighboring lights can be increased, to provide sufficient illumination to ensure the safety of person 190. Since different persons will have different desires regarding the extent of adjacent illumination, an embodiment of the present invention may incorporate custom programming of such features by individual person 190, or within standard preset selections, such as "cautious" where a relatively large number of lights are illuminated adjacent to person 190, or "carefree," where only a minimum number of lights are illuminated. Again, the level of illumination may additionally vary with relation to the person, the geometry of the building space, in accord with personal preferences, or for other reasons.

When person 190 has traveled farther, lights 509-511 may be extinguished, in effect providing a moving "bubble" of illumination surrounding person. Other lights are automatically shut-off or dimmed as desired and controlled by program. As FIG. 5 illustrates, lights within room 20 may similarly be activated and controlled, so for exemplary purposes as illustrated, light 531 may be at full intensity, lights 521-530 may be extinguished completely, and light 520 may be operating in a greatly dimmed state, but still providing adequate lighting to ease person 190.

The present invention reduces the extent of human interaction required to control various functions such as light switches and thermostats, while simultaneously increasing the capabilities of such controls. Individual or selected groups of lights may be selectively configured for optimal physiological and psychological effects and benefits for one or more applications, and then may be readily reconfigured without changes to physical structures for diverse applications having different requirements for optimal physiological and/or psychological effects and benefits.

Energy management is not solely limited to total power consumption. Peak inrush current is also an important factor monitored by many utility companies. This is the peak power draw of the power customer, for exemplary purposes within each twenty-four hour period. By controlling the timing of illumination and other equipment start-up, electrical draw may be gradually ramped up. Many devices initially draw more power at start-up than when operational. So, since each light is individually addressed and controlled and appliances or machines may similarly be controlled, the communications afforded by the present invention permit much smaller banks of devices to be started, allowing those devices to surge and then settle to lower energy requirements before starting the next bank of devices. Some devices and machines very quickly drop down to lower power draw. LED light sources are such a device. Banks of these may very quickly and sequentially be started. Other devices, such as electrical compressors found in heat pumps, refrigeration and air conditioning units, may require much more time for start-up, before additional devices should be started. Likewise, the particular order of start-up may be optimized for the various electrical loads found within a building. All of this is readily accomplished through simple programming and communication through preferred LED light sources or equivalents thereto.

Such embodiments are an improvement over conventional motion detectors, due to the "smart" nature of the optical XCVRs. Rather than waiting for a time delay as is the case with motion detectors, the optical XCVRs (and in some embodiments the optical XCVRs in conjunction with software) in the lighting fixture recognize immediately that the person has moved beyond a particular light, allowing that particular light to be dimmed or turned off. Also, this smart technology may be used to turn lights on only for people with the correct code embedded in their name tag 170. In such an embodiment, the user can walk into a restricted area, and if not authorized to be there, the lights would remain off, and if authorized the lights would turn on. Alternatively, a teacher with a name tag 170 grading papers in a classroom, for example, may use the name tag 170 to turn only the lighting near the teacher's desk at full brightness, while other lighting in the room remains at a dimmer, more energy efficient, setting.

In other embodiments of the invention, numbers of occupants within a space may be used not only for anticipating illumination, but also to control operation of other appliances and machinery within the building. Exemplary of this, but not limited thereto, are water and space heaters and coolers, and all other electrical or electrically controllable devices.

In some embodiments, the name tag 170 or VLEC/XCVR device or fixture may be used to assist emergency personnel. For example, if a person with a name tag 170 had an incapacitating emergency condition while walking along a hallway in a building with optical XCVRs the hallway lighting can be modified to direct emergency workers directly to the injured person. The lights can be made to flash, change color, or form directional arrows, or sequential directional indicators, or otherwise signify to the emergency personnel the quickest path to the person.

In some embodiments, a custom guidance system can include red, white or other suitably colored or illuminated lights which may be steady or flashing for emergency situations. Corridor lights and/or individual communication badges may be equipped to flash, directing emergency personnel to a desired location or person.

In a further embodiment of the invention, communication badge 170 may communicate with prior art screening equipment, such a metal detectors, x-ray machines, drug and explosives sniffers, and other such hardware. A building employing the present invention may incorporate multiple safety features. Instead of relying on several security guards at several stations to read badges and monitor each station, a proximity detector may first detect whether a person is passing through the entrance. If so, the adjacent LED light source will query for an appropriate or legitimate communications badge. Even if detected, if a badge has been duplicated, preferred logging and verification through software will instantly identify that the first person is already in the building. Consequently, the presently entering person and person already in the building can both be located, and the intruder identified. As discussed herein above, biometrics may additionally be incorporated, and for exemplary purposes a fingerprint scan or the like may be required to verify identity prior to passing through proximity/badge detector.

Once a valid badge has been detected, a person will continue through as many additional security checks as may be deemed appropriate, such as a metal detector and drug/explosive sniffer. Rather than requiring the traditional operator for each station, a single guard will in accordance with the present teachings often be adequate, so long as appropriate back-up is available on short notice. Because this energy management system requires far fewer human monitors, it provides additional cost saving. A guard would be needed primarily to respond if an alarm were present without having to identify several situations. A guard might be stationed only near a metal detector, for example, without having to monitor other stations. In addition, a more accurate inventory of persons, other assets, or substances in a building becomes possible. An important safety feature, however, is the greater reliability of electronics over personal vigilance.

The present invention also has the capacity to provide low power communications for energy management, emergency back-up, security and special applications utilizing alternative power sources such as batteries or solar cells. Since each individual LED light source may be separately controlled, unnecessary lights may be extinguished in an emergency. Remaining lights may be used to signal emergency routes which may be emergency exits, predetermined shelter such as in the event of a tornado, safe locations potentially determined in real time in the event of an intruder or other hazard. The remaining lights may also or alternatively be used to maintain nominal communications channels within the building. The signals in such instance may be unable to be carried through power lines, and so may alternatively be implemented through a repeater function from one light to the next to travel entirely through a chain of LED light source.

In accordance with another alternative embodiment of the present invention, building lighting may be modulated with time and date stamps or the like. Video recordings made within the space of modulated illumination will have an optical watermark automatically embedded therein. The embedding of such identifiable signals ensures the integrity of video recordings made under these lights.

Building management in accord with another embodiment of the invention further includes automated secured access control to apparatus such as doors, drawers, electronic computer operations, cars, thermostats, and any other devices that may be electronically controlled. By means of LED communication, the location of unauthorized devices as well as persons can be tracked or polled by the system.

Doors, either locked or unlocked, can be manipulated in response to the location or movement of these devices or persons.

If audio and/or video is additionally enabled, either through communications badges or separate wall-mounted devices, the video can be used to capture the last-known conditions of a user or an area. This can be important in the event a disaster strikes that results in significant destruction of property or life.

An intelligent audio/visual observation and identification database system may also be coupled to a VLEC/XCVR system or sensors as disposed about a building. The system may then build a database with respect to temperature sensors within specific locations, pressure sensors, motion detectors, communications badges, phone number identifiers, sound transducers, and/or smoke or fire detectors. Recorded data as received from various sensors may be used to build a database for normal parameters and environmental conditions for specific zones of a structure for individual periods of time and dates. A computer may continuously receive readings/data from remote sensors for comparison to the pre-stored or learned data to identify discrepancies therebetween. In addition, filtering, flagging and threshold procedures may be implemented to indicate a threshold discrepancy to signal an officer to initiate an investigation. The reassignment of priorities and the storage and recognition of the assigned priorities occurs at the computer to automatically recalibrate the assignment of points or flags for further comparison to a profile prior to the triggering of a signal representative of a threshold discrepancy.

The intelligent audio/visual observation and identification database system may also be coupled to various infrared or ultraviolet sensors, in addition to the optical sensors incorporated directly into LED light source, and used for security/surveillance within a structure to assist in the early identification of an unauthorized individual within a security zone or the presence of an intruder without knowledge of the intruder.

The intelligent audio/visual observation and identification database system as coupled to sensors and/or building control systems for a building which may be based upon audio, temperature, motion, pressure, phone number identifiers, smoke detectors, fire detectors and fire alarms is based upon automatic storage, retrieval and comparison of observed/measured data to prerecorded data, in further comparison to the threshold profile parameters to automatically generate a signal to a surveillance, security, or law enforcement officer.

Security zones which may use intelligent video/audio observation and identification database system may include, but are not necessarily limited to, areas such as airports, embassies, hospitals, schools, government buildings, commercial buildings, power plants, chemical plants, garages, and/or any other location for which the monitoring of vehicle or individual traffic and/or security is desirable.

An intelligent observation and identification database system may be arranged to learn the expected times for arrival and departure of individuals 10 and vehicles from various zones. Each time an individual or vehicle enters or exits a security zone, the system may record in the database the time and location of the arrival or exit. Thus, over time, the system may learn the expected arrival and departure times based upon the average of predetermined times, such as normal shift times. Thus, if a vehicle of an individual attempts to enter or exit a zone at a time other than the learned expected time of entry or exit, the system may alert security personnel to initiate an investigation.

If a low level tracking priority is assigned to the vehicle or individual, tracking may be accomplished by recording the location and time for each instance when the system identifies the vehicle or individual. Thus, a low level tracking priority may normally generate a log of when and where a vehicle or individual was seen. Over time, the system may learn typical paths, times and zones where specific vehicles and individuals spend their time. The system may then issue an alert when a vehicle or individual deviates from their normal path. For example, if a person normally may be found on the second floor, and they occasionally pass through first floor but have never gone to the fourth floor, then the system may alert security personnel if the person is identified by the system on the fourth floor.

Thus, the intelligent audio/visual observation and identification database system may be coupled to the operational systems for a building, such as locking systems for doors, lighting systems, air conditioning systems, and/or heating systems.

Another embodiment of the present invention incorporates guidance and communications systems. For exemplary purposes, consider the situation where a visitor wishes to meet with a regular building occupant. The visitor may be guided through any suitable color or intensity pattern such as but not limited to flashing patterns, color changes or the like in LED light source or other LED fixtures to the location or person they seek. Further, once within the same building space, the person being sought out may further be made conspicuous by similar changes in color or intensity pattern within the sought-person's communication badge, for exemplary purposes either within video display 1500 or optical transmitter 1300, as shown in FIG. 2B. Once again, such system control using the RGB LEDs of the present invention is simply a matter of software control.

In those embodiments where audio signaling or communications are enabled, and owing to the exact room position detection afforded by the present invention, location specific access intelligence may also be incorporated. As but one example, if a doctor is in a surgical room, the pager may remain silent. Once the doctor exits surgery, then the pager may be reactivated. This control may be automatic, simply incorporated into the programming of the system. As another example, students may use the preferred communication badge for communications similar to cellular telephones, including text messaging, voice communications, web access, and so forth. However, upon entering a classroom, communications might in one embodiment then be disabled, ensuring the students are not distracted with unauthorized activities. In addition to the foregoing, audio and video communications are possible in accord with light communications in locations and environments where cellular or radio communications may be impossible, forbidden, or unreliable, extending existing communications systems.

Figure 6:
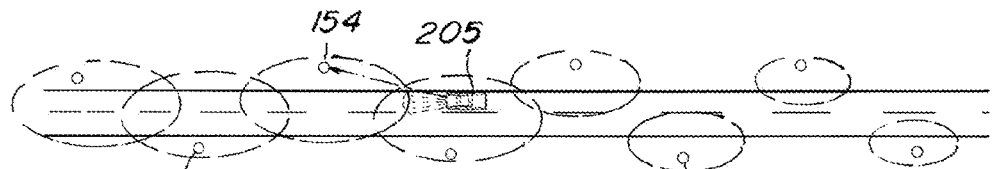
FIG. 6 is an environmental view of an alternative embodiment of the Communication System.
Figure 7:
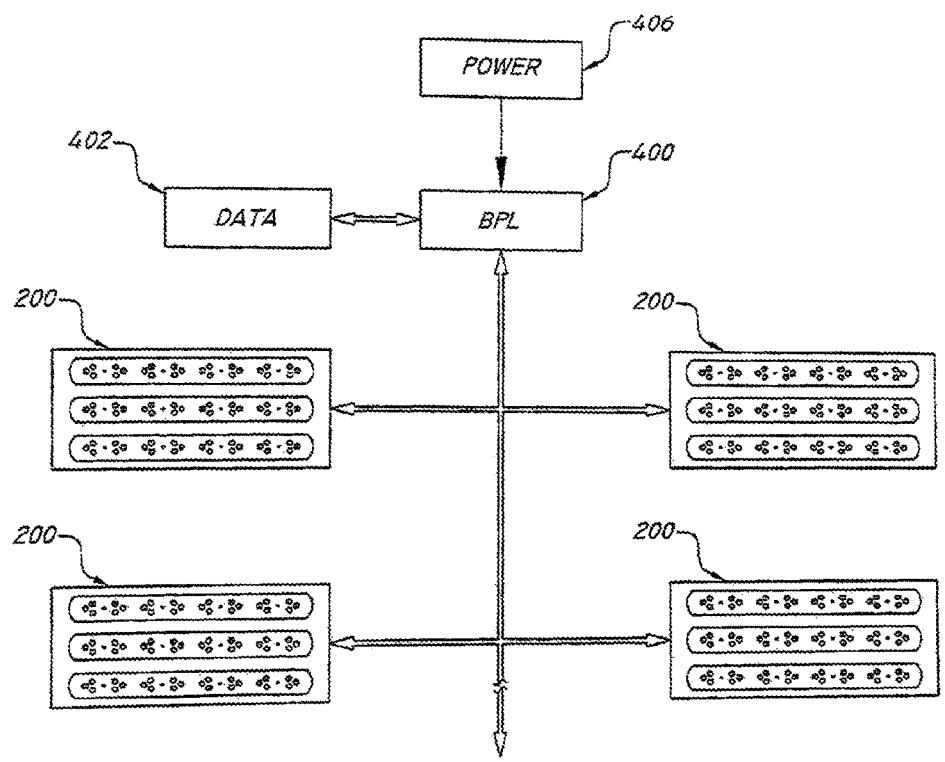
FIG. 7 is a block diagram of an alternative embodiment of the LED Communication System, depicting light sources in communication with a broadband over power line service.
Figure 10:
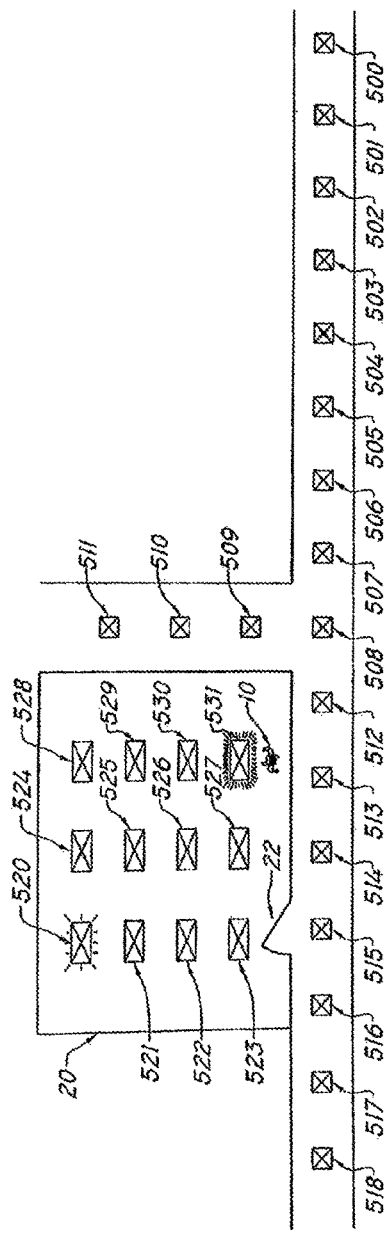
FIG. 10 is a block diagram of an alternative embodiment of the LED Communication System, depicting an energy management scheme.

The name tag embodiment need not be restricted to use by people. The name tag embodiment may be associated with cars, for example. In such an embodiment, a car 205 includes a tag (not shown) that broadcasts a unique code that may either turn street lights 154 on or increase the brightness of dimly lit street lights, as shown in FIG. 6, similar to the hallway or room lights described above. There are numerous other embodiments. For example, such a device may be used to indicate that a car is authorized to enter a restricted area. Or, such a device may be used to pay tolls on highways or pay fees at a parking garage by uniquely identifying the vehicle and the account to be charged. Alternatively, such device may be used to open garage doors.

As stated above, the LEDs may be bi-directional. In at least one embodiment, the optical XCVR is comprised of bi-directional LEDs. In such an embodiment, the optical XCVR is constructed and arranged such that at least one of the bi-directional LEDs allows parallel transmitting and receiving of light signals.

Within the disclosure provided herein, the term "processor" refers to a processor, controller, microprocessor, microcontroller, mainframe computer or server, or any other device that can execute instructions, perform arithmetic and logic functions, access and write to memory, interface with peripheral devices, etc.

In some embodiments, an optical signal amplifier is in communication with the photodiodes to increase the signal strength of the received light signals. In at least one embodiment, the LEDs are in operative communication with an LED power driver, ensuring a constant current source for the LEDs.

In some embodiments, the XCVRs and XCVRs within a name tag may include circuitry that performs modulation, demodulation, data compression, data decompression, up converting, down converting, coding, interleaving, pulse shaping, and other communication and signal processing techniques, as are known by those of ordinary skill in the art.

In one embodiment the optical XCVRs of a user's security badge communicate with the optical XCVRs in an LED light fixture. The optical XCVRs may be placed in numerous locations as lighting sources. As shown in FIG. 3, a user is shown with a name tag that is broadcasting and receiving data over an optical link using the XCVR described in FIG. 1 to a ceiling mounted fixture. The XCVR as integral to a ceiling mounted or other type of light fixture may in turn be in direct communication with a computer, processor, microprocessor, mainframe computer or server, and/or other computing device as earlier described through the use of wire, cable, optically via pulsed light communication, over a Broad Band Power Line system or over any other type of communication system.

In one embodiment the intelligent security and identification database system will record the time, date, and place of entry of an individual having a security badge or name tag into, and out of, a secured zone. In this embodiment, the recorded information may be compared in real time to previously recorded conduct or parameters for the individual security badge or name tag, to automatically identify discrepancies. Discrepancies which exceed a pre-programmed threshold may be brought to the attention of security personnel.

In one embodiment the accumulation and storage of information of the type identified above, will occur within continuously updated and evolving files, to create a database for future reference, to enable building management, law enforcement, surveillance, and/or security officers to implement a desired building status or inquiry.

In one embodiment the intelligent audio/visual database system continuously received information from fixtures or security badges in order to continuously update an operating system. In some embodiments, optical XCVRs may be integral to a series of lighting sources, or ceiling mounted light fixtures, within a building structure. The individual security badge or name tag would transmit through pulsed light communication information as previously identified as related to an individual's identity, employment occupation, security clearance, and/or primary employment location. In this embodiment, the pulsed light communication signal could be sequentially detected, received, and tracked by a plurality of XCVRs which are in continuous communication with the system processor.

In one embodiment a series of XCVRs are in communication with the system processor, mainframe computer or server, through sequential transmission and receipt of pulsed light communication signals.

In one embodiment the series of XCVRs are in communication with the system processor, mainframe computer or server, through the Broad Band Over Power Line Communication System as previously described herein.

In one embodiment the series of XCVRs are in communication with the system processor, mainframe computer or server through the use of cable, wire, or other communication media.

In one embodiment, an individual security badge or name tag may be assigned a number which is transmitted within the communication signal to the system processor, mainframe computer or server.

In one embodiment the system processor will continuously record and store in real time the received pulsed light communication signals in one or more system databases, one or more subsystem databases, or individuals specific databases, in order to establish normal routine parameters for designated locations or areas within a facility. The system processor may be programmed to compare previously stored data representative of normal routine parameters for a designated location within a facility, to the real time observed data for the designated location. The system processor preferably includes threshold software which may be used to identify any standard deviations from normal activity occurring within the designated location.

In one embodiment the system processor, mainframe computer or server may compare individual specific information with information concerning a designated location, as well as information about employees and/or supervisors in order to assist in a threshold analysis for indication of a warning or investigation signal. For example, if an employee is tracked as accompanying a supervisor into an area where clearance is required, and the supervisor is identified as having the appropriate clearance, and the supervisor is identified as having authority to escort an employee not having a designated level of clearance within a particular zone, then a threshold for identification of required investigative action may not be met.

In one embodiment the system processor, mainframe computer or server may identify individual specific pulsed light communication signals received from a location outside of an established or normal routine, and outside of a set level of deviation, for triggering of a investigation advisory. An investigation advisory would issue for a specific location and individual within a zone or facility.

In one embodiment the communication system may also be used at a check point. Information transmitted from a security badge at a checkpoint could also include motor vehicle information, make, model, and/or license plate information for the particular employee. At a facility check point retrieved information could be displayed on a monitor. The database may also include a photo of the individual associated with the security badge, where all available information could be reviewed by a security office prior to entry by into a security zone.

In one embodiment each evolving database and/or mainframe database may be capable of being continuously updated to include data saved by the VLEC/XCVR system. Access software may be used to communicate with internal databases or external or remote databases, and comparison software may be used to review data as related to the external and/or internal databases.

In one embodiment, sensitivity software is also used to establish thresholds and to issue/trigger signals, which may be displayed on the output device or monitor, and category software may be used to divide data within individual files. In addition, any other software as desired by security and/or law enforcement personnel may be utilized.

In one embodiment, the computer may implement either standard or customized queries or searches for defined profiles related to individuals or status of systems within the accumulated database for a designated zone. Upon identification of individuals or the status of systems which satisfy the profile criteria, a communication signal will be generated to advise appropriate personnel as to the status of the system or location of the individuals under consideration. The relative location of targeted individuals may be identified by proximity to one or more XCVRs as integral to lighting structures. It is anticipated that each XCVR will have a coded or digitized identification number which corresponds to a specific location within an overall communication/security plan for a facility. It is anticipated that each transmission of a communication pulsed light signal will include a code representative of the originating XCVR. Optionally additional intermediate XCVRs may add a communication pulsed light signal code representative of the transmitting XCVR.

In one embodiment, control server may initiate an inquiry to locate the identification code corresponding to a particular individual or XCVR. In this embodiment, the control server 22 would transmit a signal outwardly through the optically connected XCVRs to request identification of a particular individual or XCVR identification code. In one embodiment the inquiry may be global, or may be limited to specific periods of time or other specific conditions such as location. In one embodiment each individual XCVR upon receipt of the command inquiry may forward by pulsed light signals the individual identification codes of all individuals or XCVR's within a particular location. In some embodiments, individual identity codes are being continuously transmitted by each individual security badge. In one embodiment the individual security badge under investigation may beep or generate another signal to advise the individual that he or she needs to contact a central switchboard for transfer to another individual or for receipt of a message.

In one embodiment the evolving database and/or mainframe database may be coupled to additional identification apparatus or systems including but not limited to facial recognition, fingerprint recognition, palm print recognition, voice print recognition, eye scan, and/or signature recognition devices/systems which may be coupled to the input devices for recording of data to be stored within the system for analysis and display of a monitor.

In one embodiment the communication system including the XCVR may be incorporated into a hand held or portable unit. In other embodiments the communication system may be incorporated into a device such as a cellular telephone.

In one embodiment the evolving database and/or mainframe database may illuminate a pathway on sequential XCVRs representative of the shortest route to a specific location to assist individuals. In one embodiment the evolving database and/or mainframe database may include probabilistic analysis software which may be used to assist in the establishment of threshold levels for issuing a warning or investigation signal. In addition the evolving database and/or mainframe database may include Principle Component Analysis (PCA) software and Eigenvector or Eigenspace decomposition analysis software to assist in the establishment of thresholds.

In one embodiment, the evolving database and/or mainframe database may learn and recognize repetitive patterns within the accumulated database. Therefore, the computer may assess a low query priority to repetitive and/or regular patterns, and implement a more expedited search related to non-regular pattern data as stored within the accumulated database. Any parameters may be selected for the recognition of patterns within a zone dependent upon individual environmental conditions and customized needs at each independent zone. For example, six days of repetitive actions may be required to establish a regular pattern of conduct within a first zone 50 where two months of repetitive conduct may be required to establish a regular pattern within a second zone.

In one embodiment, during pattern learning, the computer sensitivity may be established by the initial creation of a file and/or data pertaining to an individual. Next, the input of a desired amount of data representative of repeated actions may be required. The number or amount of data may represent repetitive occurrences. The occurrences may be required to be within a certain classification, such as all within a certain zone, or all within a certain period of time during the day, such as between 3 and 4 o'clock p.m. The control computer may then calculate a mean value based upon the recorded data. Alternatively, the recorded data may be divided into more than one segment and a mean may be calculated for each desired segment. The control computer will generally continue to store data, and therefore update the pattern, as detected by the XCVRs. The control computer is preferably designed to recalculate a mean for the data following each additional data entry. The control computer may include sensitivity trigger software which as earlier described will identify a desired threshold deviation from the calculated mean, which may be more or less than one standard deviation from the calculated mean. Alternatively, the sensitivity trigger may be established at a certain percentage for deviation from the calculated mean. The control computer continually compares the observed occurrence information to the calculated mean data to determine if investigation signals are required to be communicated to building management, building maintenance, law enforcement and/or security officers. In this respect, the computer is engaged in updating activities becomes smarter and more efficient in analyzing risk situations over time.

In one embodiment the communication system is preferably proactive and is continuously screening and comparing data being input from the XCVRs for comparison to the previously stored records within the accumulated database.

Another embodiment of the present invention incorporates Global Positioning System (GPS) information into the data packet to be sent. The Global Positioning System is described in U.S. Pat. No. 4,785,463, the entire contents of which are expressly incorporated herein by reference. GPS positioning uses one or more coordinate systems, such as World Geodetic System 1984 (WGS84), to provide a reference frame, allowing every point on earth to be coded with a unique GPS location.

A data packet may include GPS location header bits that include the packet's destination address in GPS coordinates. The data packet may further include GPS location trailer bits that include the packet's origin address in GPS coordinates. The data packet may further include the address in GPS coordinates of the optical XCVR that most recently transmitted the packet (the last known transmission address, or LTA). The data packet further includes the data to be transmitted, and may include any other bits of information determined to be necessary for successful transmission of data, such as error detection bits.

Routing data packets from one location to another location can be accomplished using GPS location information tags which tag data packets having a geographic location instead of a cyber-location. Such an embodiment eliminates the need for any later geographic location translation because a data packet starts with geographic source and destination information. This simplifies locating the destination of the data packet.

Figure 12:
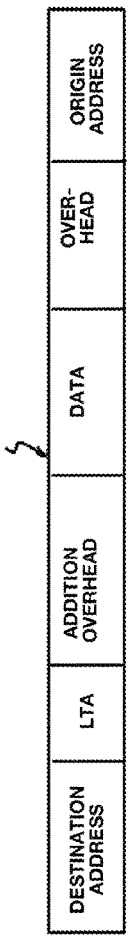
FIG. 12 is a block diagram of an exemplary embodiment of a data packet.
Figure 11:
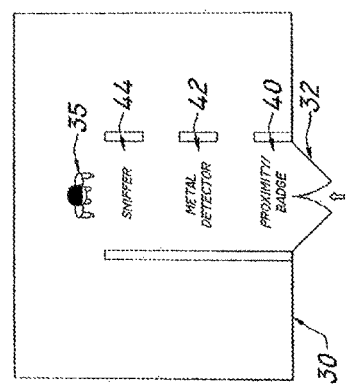
FIG. 11 is a pictorial representation of an alternative embodiment of the LED Communication System, depicting an exemplary security screening process.

In some embodiments, each data packet is assigned a GPS origin/destination address as it passes through the network infrastructure. The data packet is always searching for the next closest GPS address location. Each stationary (or static) optical XCVR, and some dynamic optical XCVRs, within a network will be designated with a GPS location number. As a data packet passes through the network, it is routed by the optical XCVRs, with their internal processors, to the next physically closer optical XCVR within the network. If another optical XCVR is within receiving range, or is connected with another form of communication medium, that optical XCVR receives the data packet. The optical XCVR's internal processor compares its internal GPS location address (ILA) to the data packet's GPS destination address and the optical XCVR's last known transmission address (LTA) stored within the data packet. If the ILA code is closer to the data packet destination address than the LTA code stored within the data packet, the optical XCVR's processor inserts its ILA code into the data packet as the new LTA code and then repeats transmission of the entire data packet with the updated LTA code. An exemplary data packet 210 including GPS address information is shown in FIG. 12.

The network continues this process until the data packet reaches the destination optical XCVR, at which point the data packet is transmitted. If a piece of the infrastructure is missing, the packet will be rerouted to the next nearest optical XCVR and continue until it finds the shortest pathway through the network to the destination address.

This means that each user on the network may declare one or more static positions and also have a dynamic position. A static address may be a home, an office, etc. When a user leaves their static address location to move through the network infrastructure, the user then becomes dynamic. The network may track the user as the user passes optical XCVRs, similar to that of cell phones in relation to cell phone towers, and provide a dynamic address location. If a data packet begins with a destination address that is the user's static address, the network may update the packet with the user's new dynamic address and reroute the packet accordingly, in a scheme similar to that of cellular phones. In at least one embodiment, the pulsed LED light signal may be used to generate optical pulses to be received by a first receiver to transmit a security code for access to a gated community, garage, and/or secure parking lot. In these instances, the second LED illumination sources generate a pulsed LED light signal for receipt by the first receiver which in turn is coupled to a first controller and a switch to open an otherwise locked gate.

In some alternative embodiments, all of the features and functions as earlier described may occur through the use of an LED XCVR light fixture generally identified by reference numeral 250.

In some alternative embodiments as may be seen in FIG. 13, the front of the LED XCVR light fixture 250 is shown which is substantially square. The LED XCVR light fixture 250 in some embodiments may be rectangular or the LED light units 252 may be disposed in rows as shown in FIG. 15 to replace one or more tubular fluorescent light bulbs. In some embodiments, the front of the LED XCVR light fixture 250 may include photodiodes 254, cameras 256, and/or microphones 258.

In at least one embodiment as depicted in FIG. 14, the rear panel 262 of an LED XCVR light fixture 250 is shown.

In at least one embodiment, the rear panel 262 includes a LED transceiver unit 266 (Charlie unit), a power unit 260, and a Broad Band over Power Line (BPL) decoder 282. Power enters power unit 260 through cable 264. The power includes the Orthogonal Frequency-Division Multiplexing (OFDM) signals as carried over the power line. In some embodiments, the OFDM signals are pulled off the power line by the BPL decoder 282 converting the OFDM signals to data signals which are then transferred by cable 284 (which may be at Cat 5 or Cat 6 cable) to the transceiver unit 266 which includes circuit boards forming controller to regulate LED pulsed light illumination, communication and/or information/data transfer from LED light units 252 disposed on the front of LED XCVR light fixture 250. The transceiver unit 226 function is in communication with the photodiodes 254 on the front of the LED XCVR light fixture 252 for transfer or communication upstream as digital signals through cable 284 to the BPL Decoder 282 which in turn may convert the data signals to OFDM signals over a power line to a different designated XCVR transceiver unit 266 as integral to another LED XCVR light fixture 252 or other computing device which may be a server.

In one alternative embodiment as may be seen in FIG. 15 an alternative configuration of an LED XCVR light fixture 250 is disclosed having to horizontal strips of LED light units 252 where each strip of LED light units 252 may include between 8 and 24 or more individual LED's. In alternative embodiments, each strip LED light unit 252 may include a larger or smaller number of LED's as desired for a particular application or size of light fixture.

Figure 16:
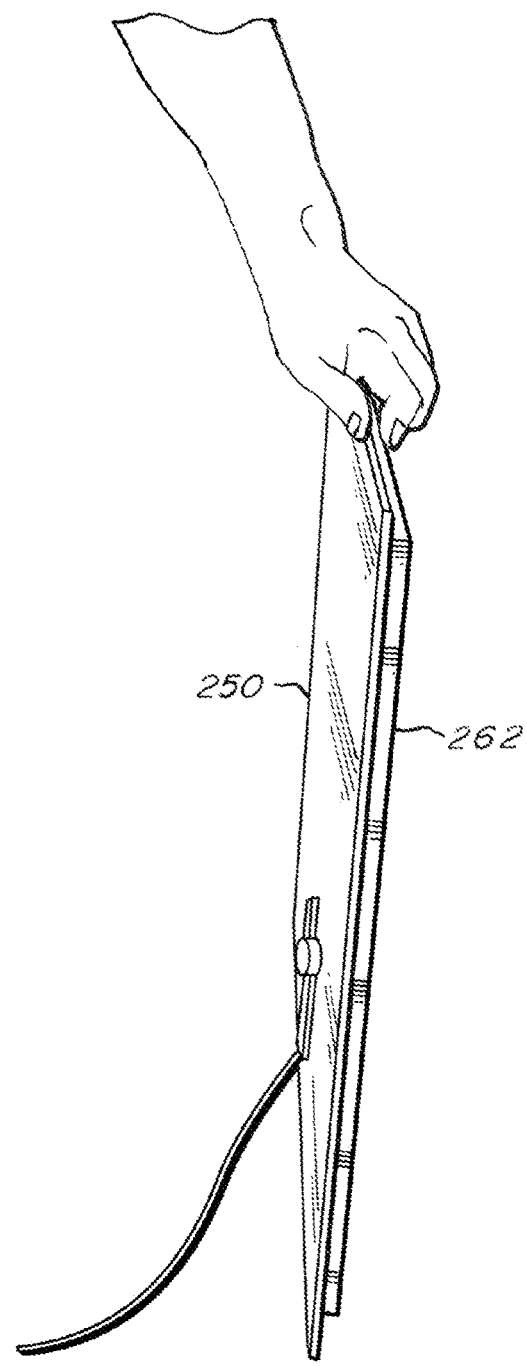
FIG. 16 is a side environmental view of one alternative embodiment of an LED light fixture.

In at least one alternative embodiment as depicted in FIG. 16, a side view of one alternative embodiment of an LED XCVR light fixture 250 is shown. As shown in FIG. 16, the LED XCVR light fixture 250 is relatively thin for replacement of a traditional ceiling light fixture.

Figure 17:
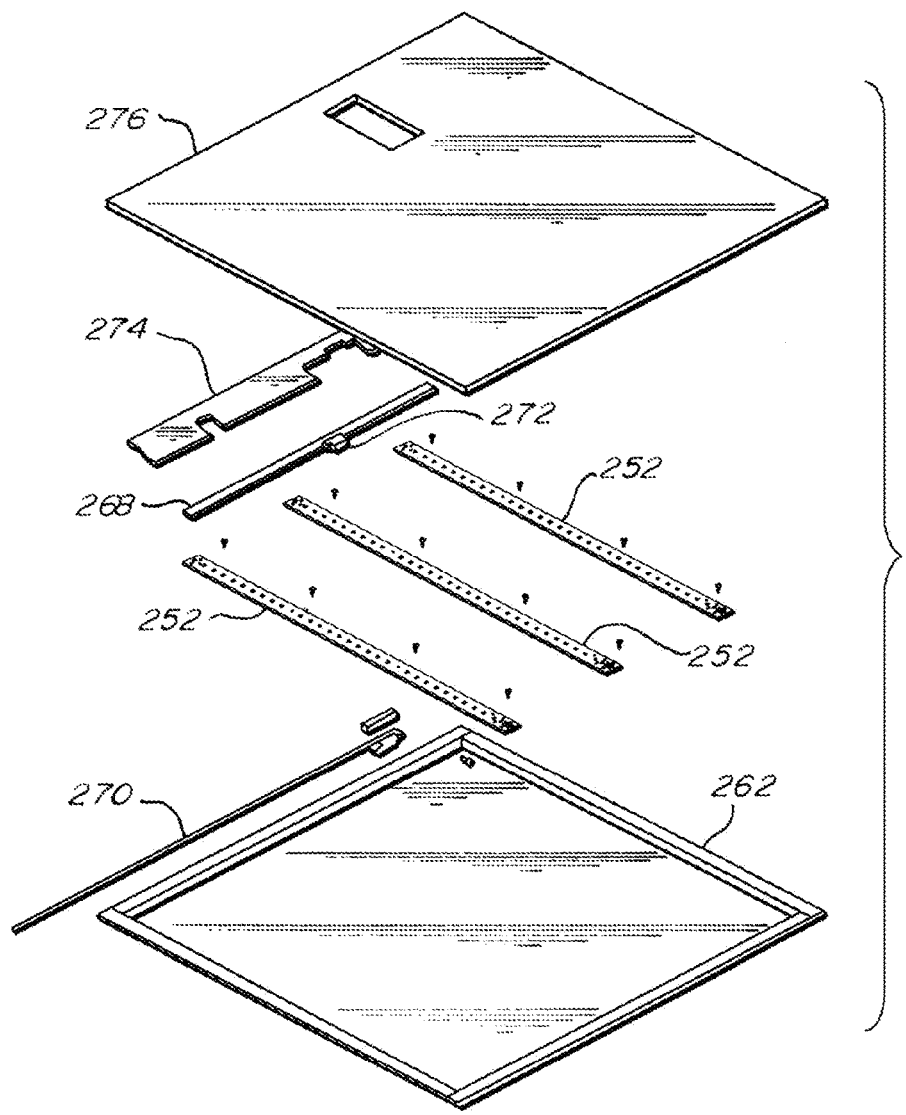
FIG. 17 is an exploded view of one alternative embodiment of an LED light fixture.
Figure 20:
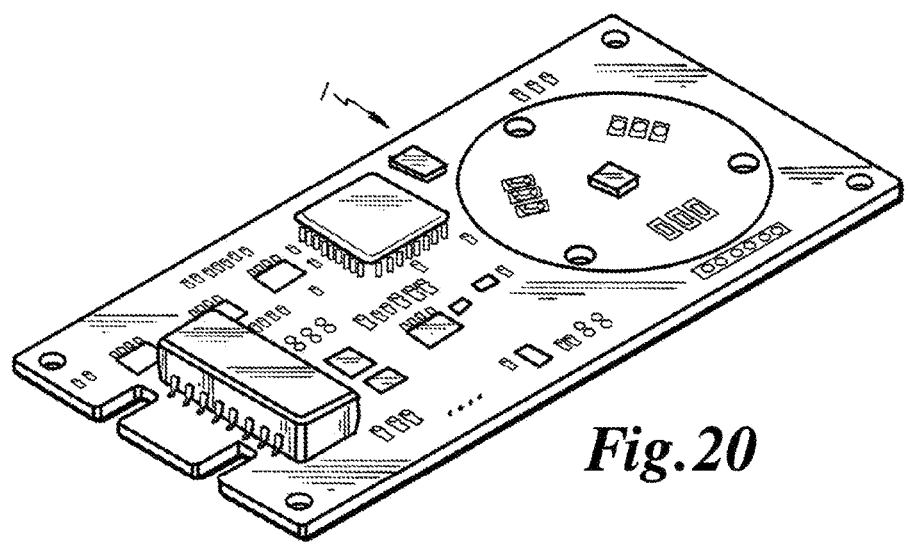
FIG. 20 is an alternative isometric view of one embodiment of a circuit board as used in an LED light fixture.

In at least one alternative embodiment as shown in FIG. 17 an LED XCVR light fixture 250 includes a rear panel 262. Within the interior of the rear panel 262 may be disposed a printed circuit board 280. In some embodiments the printed circuit board 280 engages the LED light sources 278 to form a strip LED light unit 252. In some embodiments the strips of LED light units 252 are electrically connected to a power distribution interconnect 268 which in turn is positioned proximate to, and is in electrical communication with, a power cable 270. In some embodiments the power distribution interconnect 268 includes an electrical connector 272. In some embodiments the LED XCVR light fixture 250 also includes electrical support frame member 274 as well as a prismatic light diffuser 276 which is used to diffuse light generated from the LED light units 252.

In one alternative embodiment as shown in FIG. 18 a strip LED light unit 252 is shown in detail. Each strip LED light unit 252 preferably includes a plurality of regularly spaced and aligned LEDs's 278, which may be individually engaged to, and in electrical communication with a printed circuit board 280.

In one alternative embodiment as shown in FIG. 19 the power distribution interconnect 268 is shown in detail. The power distribution interconnect 268 includes electrical connector 272 which receives power from power cable 270 and provides power to printed circuit board 280 or strip LED light units 252 through electrical connectors 282.

From a manufacturing perspective, designing LED XCVR light fixtures 250 having increased quantities of LEDs per fixture, results in greater energy efficiencies and longer fixture life. In some embodiments, greater quantities of light or illumination may be produced with less electricity when multiple LEDs are used to create the light or illumination because each LED operates more efficiently. LEDs which operating more efficiently, operate at cooler temperatures, and cooler temperatures results in longer LED and fixture life.

The transmission of pulsed light communication and data signals as wireless light signals does not cause interference like radio wave signals such as Wi-Fi. As such, pulsed light communication and data signals are wireless communication which provide higher data transfer speeds and greater security, as opposed to Wi-Fi technologies, but pulsed light communication and data services may safely be used in places where Wi-Fi transmissions are potentially harmful or limited, such as in hospitals or on airplanes.

In some embodiments, one or more LED XCVR light fixtures 250 may be connected to a computer network with Cat5 or fiber optic cables, or through existing electrical wiring (similar to Broadband over Power Line, BPL). By utilizing existing electrical wiring, expansion of costly communication infrastructure throughout a customer's facility may be avoided.

The use of LED pulsed light communications and data transfer through LED XCVR light fixtures 250 enhances the capacity and security of wireless Internet, mobile broadband applications, Voice over Internet Protocol (VoIP), and many other data communication services. For example, the expansion of the LED pulsed light communication and data transfer system network will allow data traffic on mobile networks to be offloaded onto fixed pulsed light communication and data transfer networks, thereby relieving pressure from increasing mobile data application demands. In addition, LED lights are highly energy efficient, consuming a fraction of the energy that conventional fluorescent lights consume. In some embodiments, the use of LED lighting systems may be expected to provide 50-70% reductions in energy consumption. In addition to greater energy efficiencies, LED XCVR light fixtures 250 having a larger number of LEDs operate at cooler temperatures. Cooler temperatures results in longer fixture life.

In some alternative embodiments, a client customer may lease a Key or dongle device to access the LED pulsed light communication and data transmission system network through a client's computer. Keys or dongle devices are electronic devices designed to interface with a computing device and allow the computing device to access the Internet or other networks through the LED XCVR light fixtures 250. In some embodiments, a Key or dongle device may interface with a computer through a USB port.

In some embodiments, the LED XCVR light fixtures 250 will be sized and configured to replace Medium Screw Base, General Service Lamps (MSB-GSL) (standard Edison base light bulb) which in turn may be used in a residential location.

In at least one embodiment, the LED XCVR light fixture 250 is connected to an electronic module (Charlie unit) which controls the communication aspects of the LED XCVR light fixture 250. In some embodiments, each Electric Module will be FPGA (Field Programmable Gate Array) enabled to facilitate ease of software upgrades.

In at least one embodiment, a LED XCVR light fixture 250 includes the features of Remote Access Management; Analog communication scheme (i.e. OFDM signaling); Integrated carrier signal technology; Global Positioning System routing Service (GPSrS) capabilities; and Remote Access Management for integration with utility companies.

In one alternative embodiment, a LED XCVR light fixture 250 includes a 2'×2' circuit board with 27 LEDs. The LED XCVR light fixture 250 may also include a processor and communicating receiver circuitry which may be designed as a modular component. In some embodiments, the LED XCVR light fixture 250 may be powered by 110 volt outlet and connected to Local Area Network with standard Ethernet cabling.

In at least one alternative embodiment, a LED XCVR light fixture 250 includes a 36 LED panel. In this embodiment, the LED XCVR light fixture 250 is designed to function with a detachable processor and communication receiver module and is powered by 110 volt outlet. In addition, the LED XCVR light fixture 250 may include a diffuser to softer and provide a more pleasant lighting feel.

In at least one embodiment, a LED XCVR light fixture 250 may be in communication with BPL adapters (Netgear Powerline AV 200) to establish network connectivity between the LED XCVR light fixture 250 and at least one local area network.

In at least one embodiment, an LED XCVR light fixture 250 includes a wide-angle receiver. In at least one alternative embodiment, an LED XCVR light fixture includes a 1-5/8" narrow-angled receiver.

In at least one embodiment, the LED XCVR light fixture 250 is sized to replace a standard T8 fluorescent lamp. The lumen output of two 20 inch T8-3 mb LED Lamps as depicted in FIG. 15 is the same as the lumen output of one standard 32 watt T8 fluorescent lamp. One T8-3 Mb LED Lamps may consume 12 watts, have an efficiency of 104 lumens per watt, and may be BPL enabled, thereby enabling data to be sent through existing electrical wiring.

In some embodiments, the LED XCVR light fixture 250 points the control of the color temperature output of illumination from a cool white to a warm yellow. The control of the color temperature may occur through the use of a Charlie unit or control server.

In some embodiments, each LED XCVR light fixture 250 will include Global Positioning System routing Service (GPSrS) addresses and Remote Access Management for integration with utility companies as described or as incorporated by reference herein.

In at least one embodiment, each LED XCVR light fixture 250 will include Remote Access Management (RAM) software which will allow accurate monitoring and control of individual LED Lights within the LED XCVR light fixture 250 from a centralized computing location. The RAM software may be programmed to turn LED's within the LED XCVR light fixture 250 on/off during specific times of the day, increase/decrease in brightness or compensate for daylight hours. With these features, a building owner employing use of LED XCVR light fixtures 250 may more accurately monitor and manage energy lighting consumption in a building.

In at least one embodiment, 22"×36" LED XCVR light fixtures 250 may be used in a structure. The LED XCVR light fixtures 250 may be connected to a power unit. In some embodiments, each power unit may support up to 16 LED XCVR light fixtures 250 at a time. In some embodiments, a power unit may inject power into the LED XCVR light fixture 250 and the data leaving the power unit may travel back through wires, to a power unit controller.

In some embodiments, a power unit may be housed in a rectangular box having a plurality of RJ-45 plug in slots. In some embodiments, a power unit consists of a power supply, an injector board which includes the 16 ports for POE connections to the LED lights or light fixtures and also a switch, which is integrated into the power unit.

In some embodiments, a monitoring or a metering board may be located below the switch that meters the amount of electricity used by the LED XCVR light fixture 250. In some embodiments, multiple power units may be use in a building, however each building, or each facility may have a power unit controller. In at least one embodiment, one function of the power unit controller is to aggregate all the connections from the LED XCVR light fixtures or LED lights back through the power units to an Internet connection.

In some embodiments, the power unit controller may be a control computer having a Web server. In some embodiments, the control computer may have a custom website. The website preferable includes webpages that allow the control of the LED lights or LED XCVR light fixtures 250 or other functions with a facility, and to monitor the amount of energy the LED XCVR light fixtures 250, or other features are using. The website may also provide security authorization for logon and control access to LED's or other LED XCVR light fixtures 250. The website may issue commands to the to the power units to change the intensity of the LED's in the LED XCVR light fixtures 250.

In some embodiments, each of the LED XCVR light fixtures 250 include a unit controller and photodetector which allows pulsed light communications with a client device. The client device, which may be a USB interface device, may be attached to laptops or computers. In addition, drivers for the interface devices may be installed on electronic devices such as a tablets, smart phones, computers or other electronic devices with or without the use of an application, or laptop or through an Ethernet connection.

In some embodiments, the power supply provides 600 watts of electricity to the LED XCVR light fixture 250.

In some embodiments, an LED XCVR light fixture 250 may be connected to a power unit through an Ethernet connection. In some embodiments, Pro FTM signals, which may be identified as data, may be communicated over the same lines that are used to provide power, prior to transmission through the pulsed light signals.

In some embodiments, three modules may be provided which are used in decoding of information and/or communication signals transmitted by pulsed lights. Decoding may be occurring and overriding the power line radio wave signals, or the OFTM signals, where the decoding is communicated back into an Ethernet standard computer format, which then is communicated through LED pulsed light communication signals.

In some embodiments, a control computer located at a remote location may record data generated in association with the regulation and use of one or more LED XCVR light fixtures 250. The control computer may process any number of different information or communication transmissions. Any data may be retrieved for generation through the website interface for transmission over a power line or through pulsed LED light communication signals via the LED/s or the USB device. LED pulsed light communication signals may also be transmitted out of the USB device for receipt by the LED XCVR light fixture 250 for transmission to the control computer and website. It should be noted that a control computer or server may simultaneously receive and process data from any number of websites representative of any number of facilities or geographic areas each having any desired number of fixture controllers and/or LED lights or LED XCVR light fixtures 250.

In some embodiments, each LED light fixture may include a digital potentiometer and photo diodes for receiving a light signal, and the intelligence to convert that light signal to a wired data signal. In the other direction, a controller in association with an LED XCVR light fixture converts wired data signals into the light pulses emitted by the LEDs in the LED XCVR light fixture 250.

Figure 22:
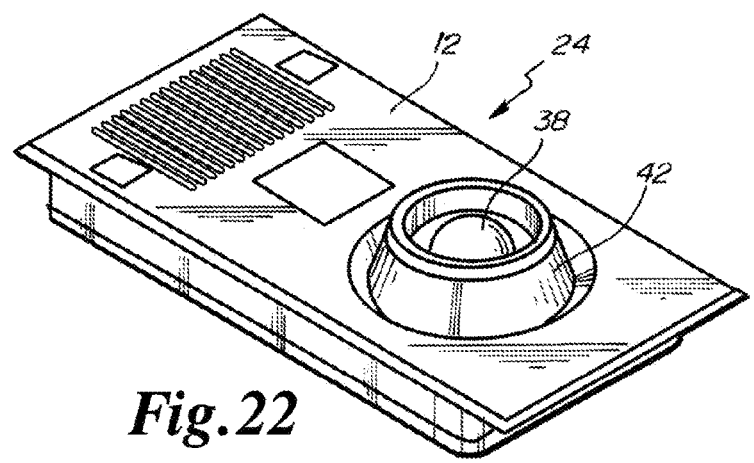
FIG. 22 is an isometric view of one alternative embodiment of a transmitter/receiver of an LED light fixture.
Figure 21:
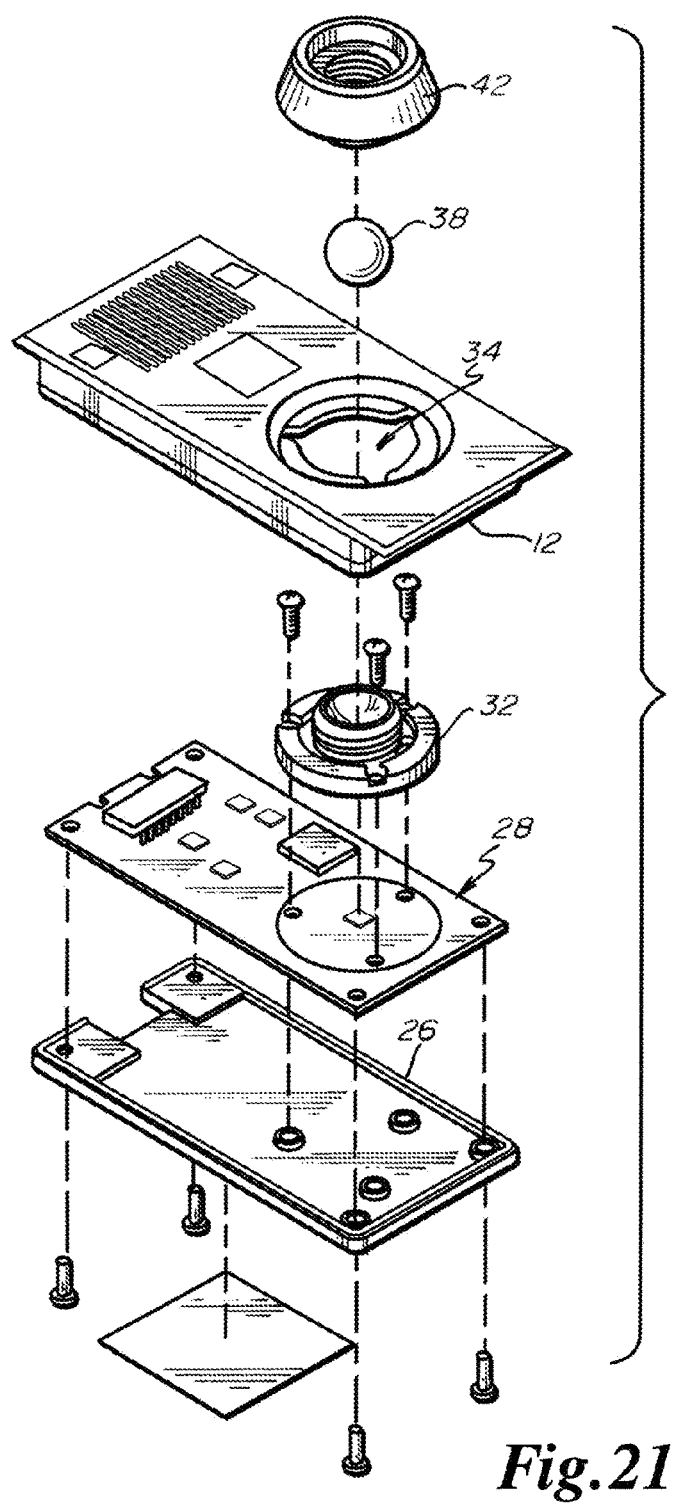
FIG. 21 is an alternative exploded view of one embodiment of a transmitter/receiver of an LED light fixture.

In at least one embodiment as depicted in FIGS. 21 and 22 LED light fixture 250 will include the components of a visible light transceiver or Charlie unit generally referred to by reference numeral 24. The visible light transceiver 24 includes an outer casing 12 and a lower casing 26. Inside the outer casing 12 and lower casing 26 is preferably disposed the main circuit board 28 (FIG. 13). An LED 30 is preferably in electrical communication with one or more circuit boards 28. In some embodiments, an inner lens retainer assembly 32 is disposed on circuit board 28 over LED 30. The inner lens retainer assembly 32 preferably traverses opening 34 through outer casing 12. The inner lens retainer assembly 32 in some embodiments includes a semi-spherical or parabolic surface 36 (FIG. 24) which is constructed and arranged to receive a spherical object or fall lens 38. In some embodiments, the lens 38 is not required to be spherical in shape.

Figure 23:
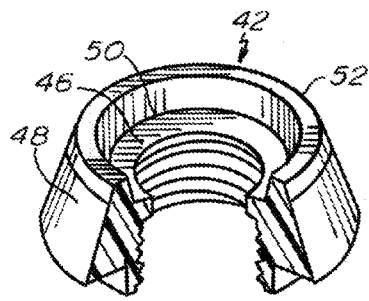
FIG. 23 is a detail partial cut away isometric view of one alternative embodiment of an outer lens retainer assembly.

In some embodiments, a portion of the exterior surface of the inner lens retainer assembly 32 is threaded and is constructed and arranged to receive the threads of an outer lens retainer assembly 42 (FIG. 23).

Figure 24:
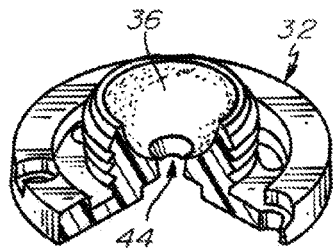
FIG. 24 is a detail partial cut away isometric view of one alternative embodiment of an inner lens retainer assembly.
Figure 25:
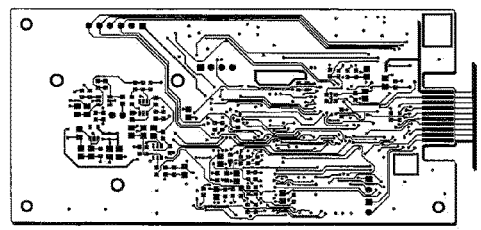
FIG. 25 is an alternative view of one embodiment of a layout of the bottom layer of a circuit board as used in an LED light fixture.
Figure 26:
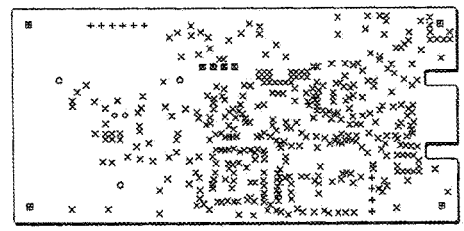
FIG. 26 is an alternative view of one embodiment of a drill drawing for one layer of a circuit board as used in an LED light fixture.
Figure 27:
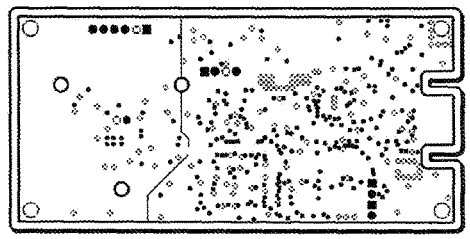
FIG. 27 is an alternative view of one embodiment of a layout of a ground plane layer of a circuit board as used in an LED light fixture.
Figure 28:
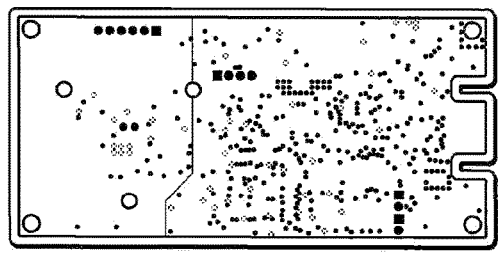
FIG. 28 is an alternative view of one embodiment of a layout of a power plane layer of a circuit board as used in an LED light fixture.
Figure 29:
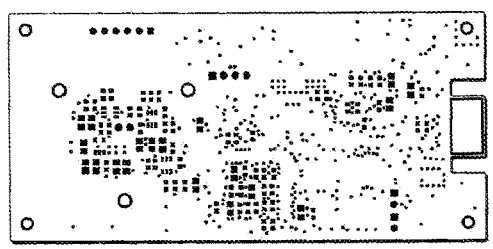
FIG. 29 is an alternative view of one embodiment of a layout of a soldermask bottom of a circuit board as used in an LED light fixture.
Figure 30:
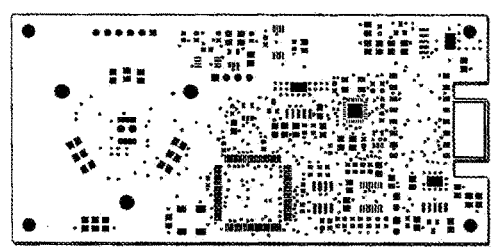
FIG. 30 is an alternative view of one embodiment of a layout of a soldermask top of a circuit board as used in an LED light fixture.
Figure 31:
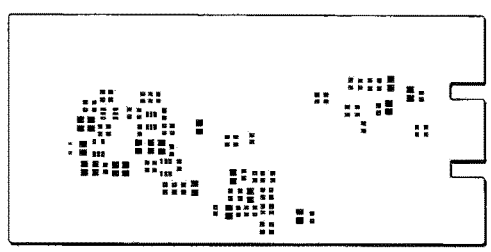
FIG. 31 is an alternative view of one embodiment of a layout of a paste bottom of a circuit board as used in an LED light fixture.
Figure 32:
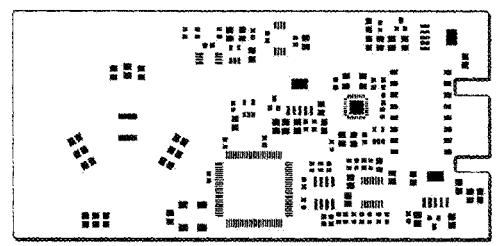
FIG. 32 is an alternative view of one embodiment of a layout of a paste top of a circuit board as used in an LED light fixture.
Figure 33:
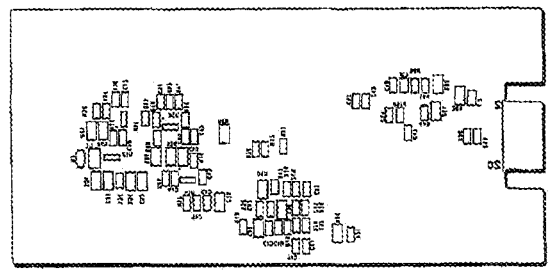
FIG. 33 is an alternative view of one embodiment of a layout of a silkscreen bottom of a circuit board as used in an LED light fixture.
Figure 34:
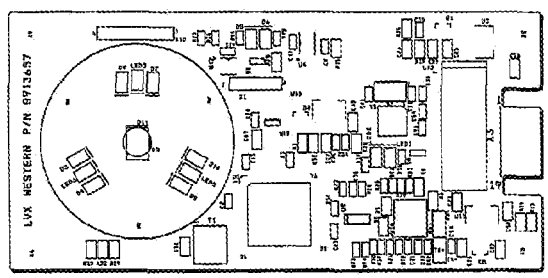
FIG. 34 is an alternative view of one embodiment of a layout of a silkscreen top of a circuit board as used in an LED light fixture.
Figure 35:
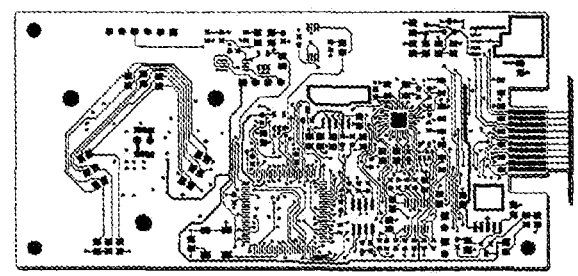
FIG. 35 is an alternative view of one embodiment of a layout of the top layer of a circuit board as used in an LED light fixture.
Figure 36:
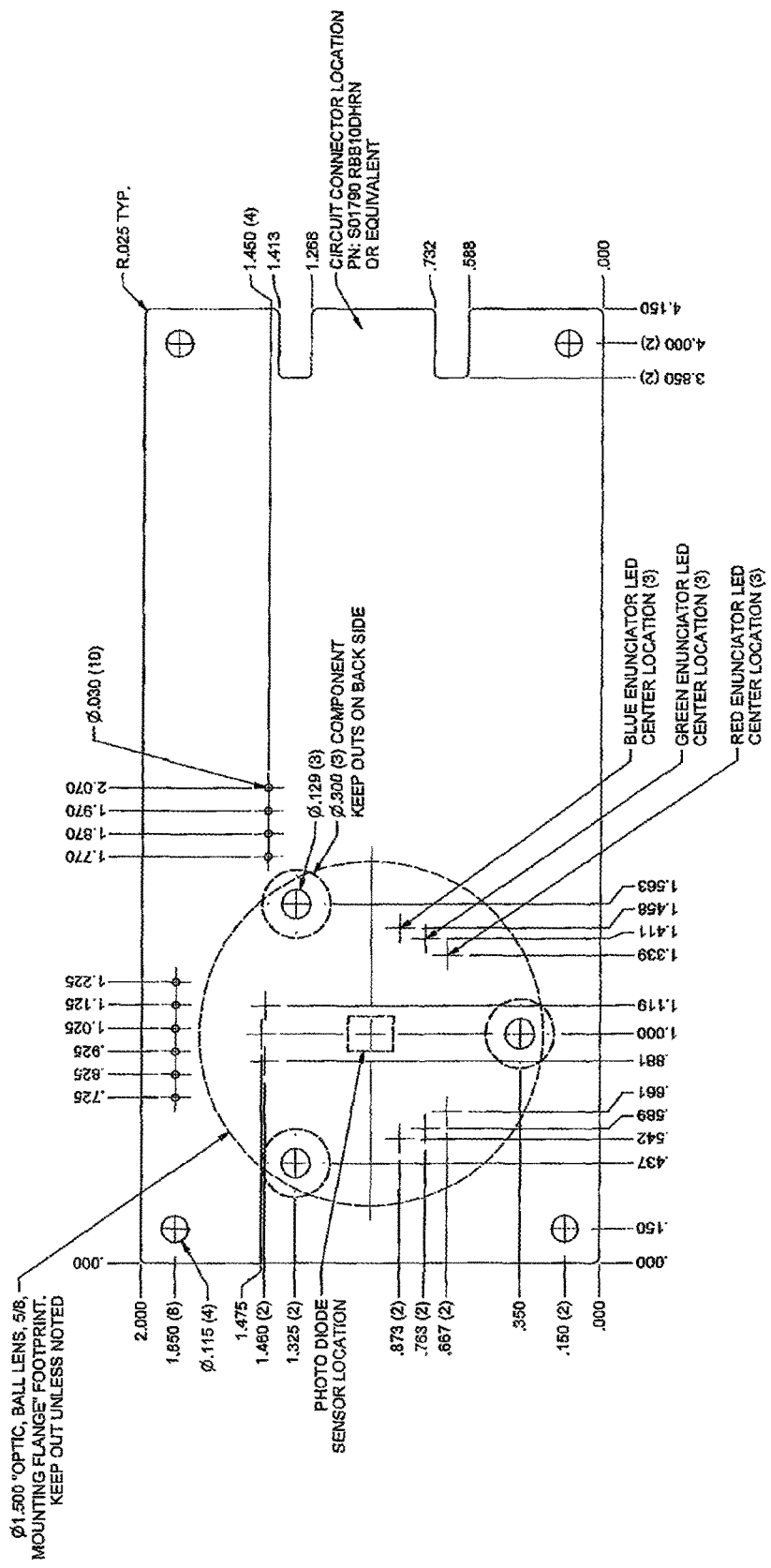
FIG. 36 is an alternative view of one embodiment of a layout of a layer of a circuit board as used in an LED light fixture.
Figure 37:
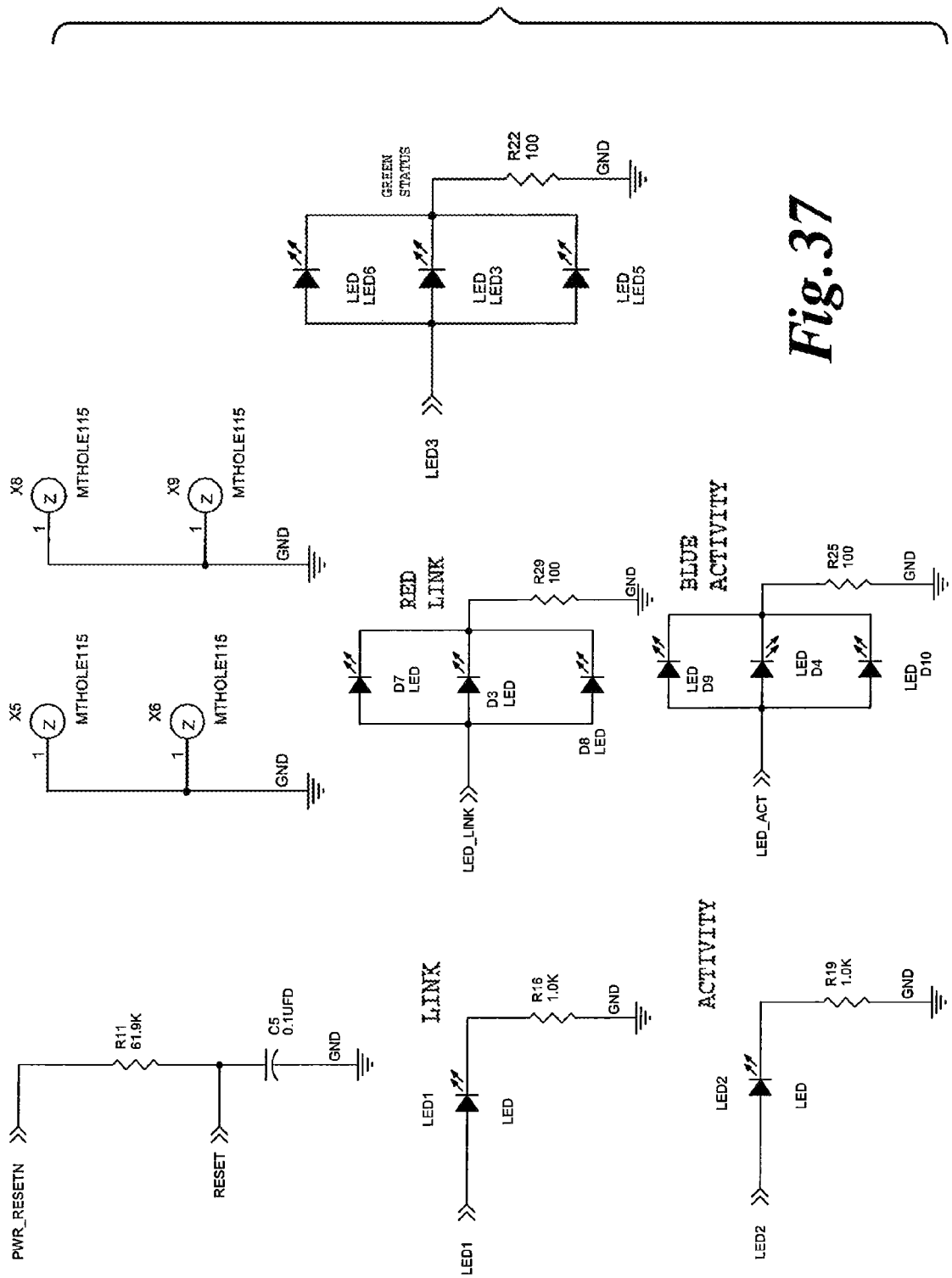
FIG. 37 is a partial electrical schematic of one alternative embodiment of an LED light fixture.
Figure 38:
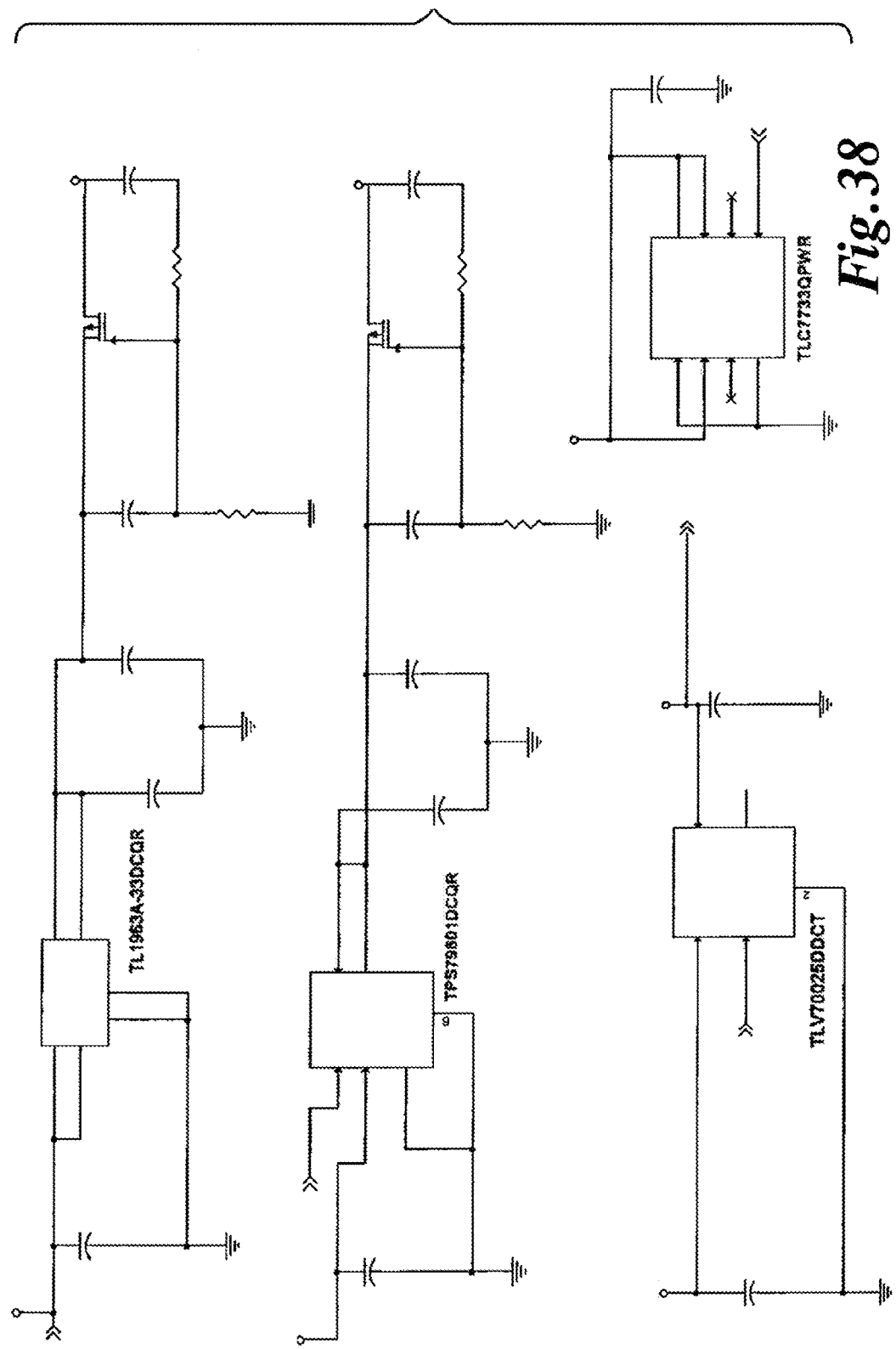
FIG. 38 is a partial electrical schematic of one alternative embodiment of an LED light fixture.
Figure 39:
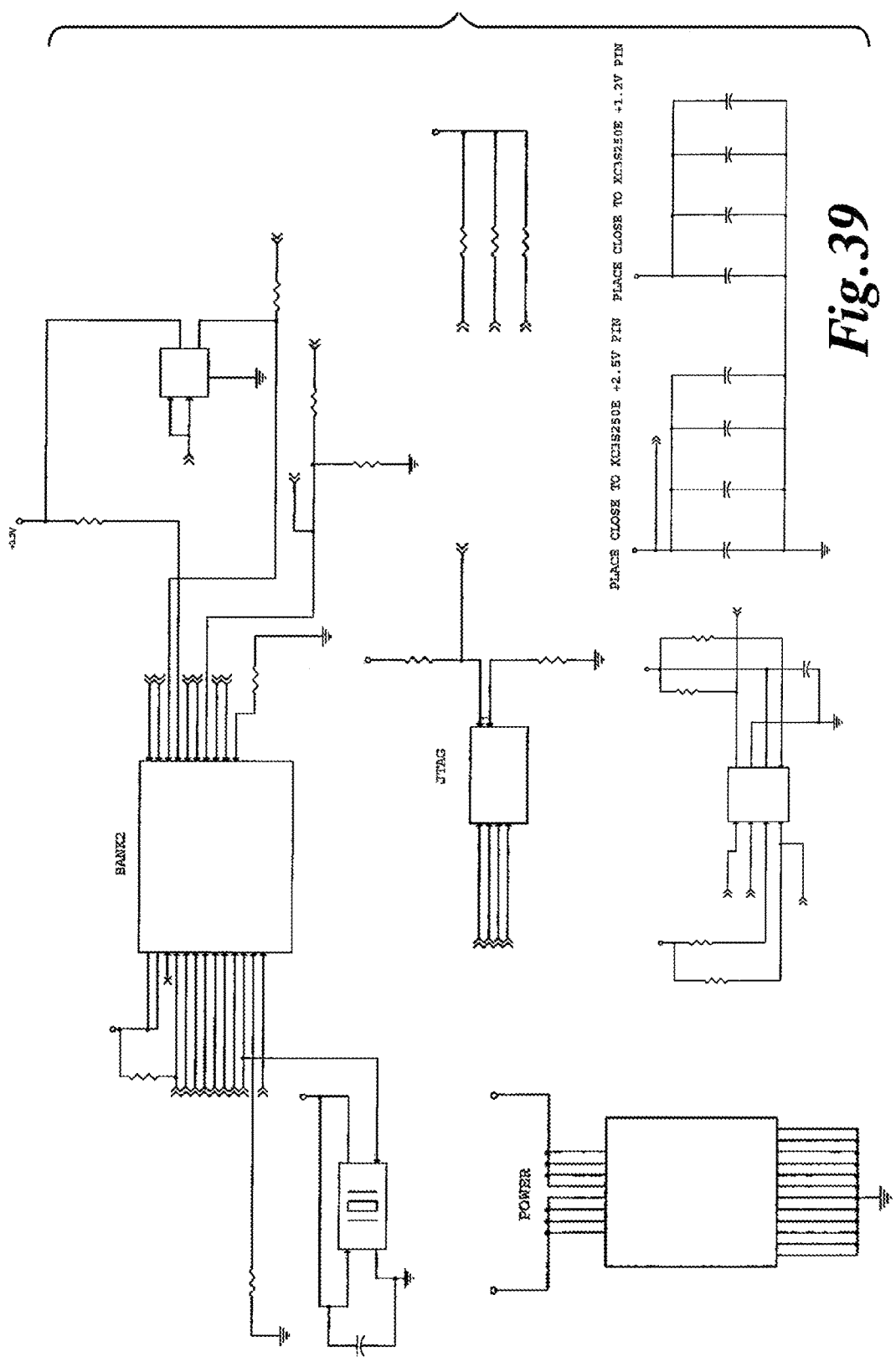
FIG. 39 is a partial electrical schematic of one alternative embodiment of an LED light fixture.
Figure 41:
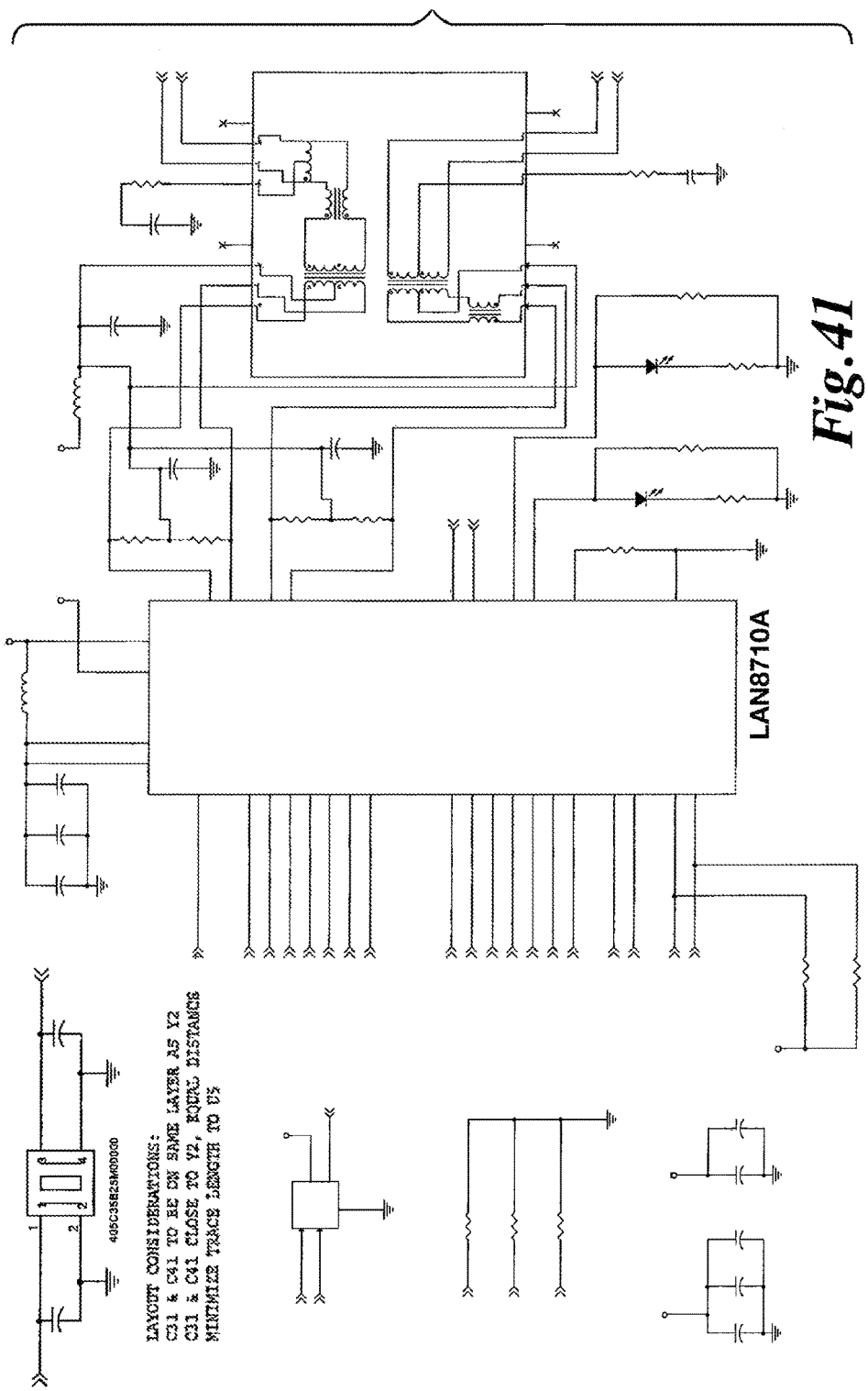
FIG. 41 is a partial electrical schematic of one alternative embodiment of an LED light fixture.
Figure 42:
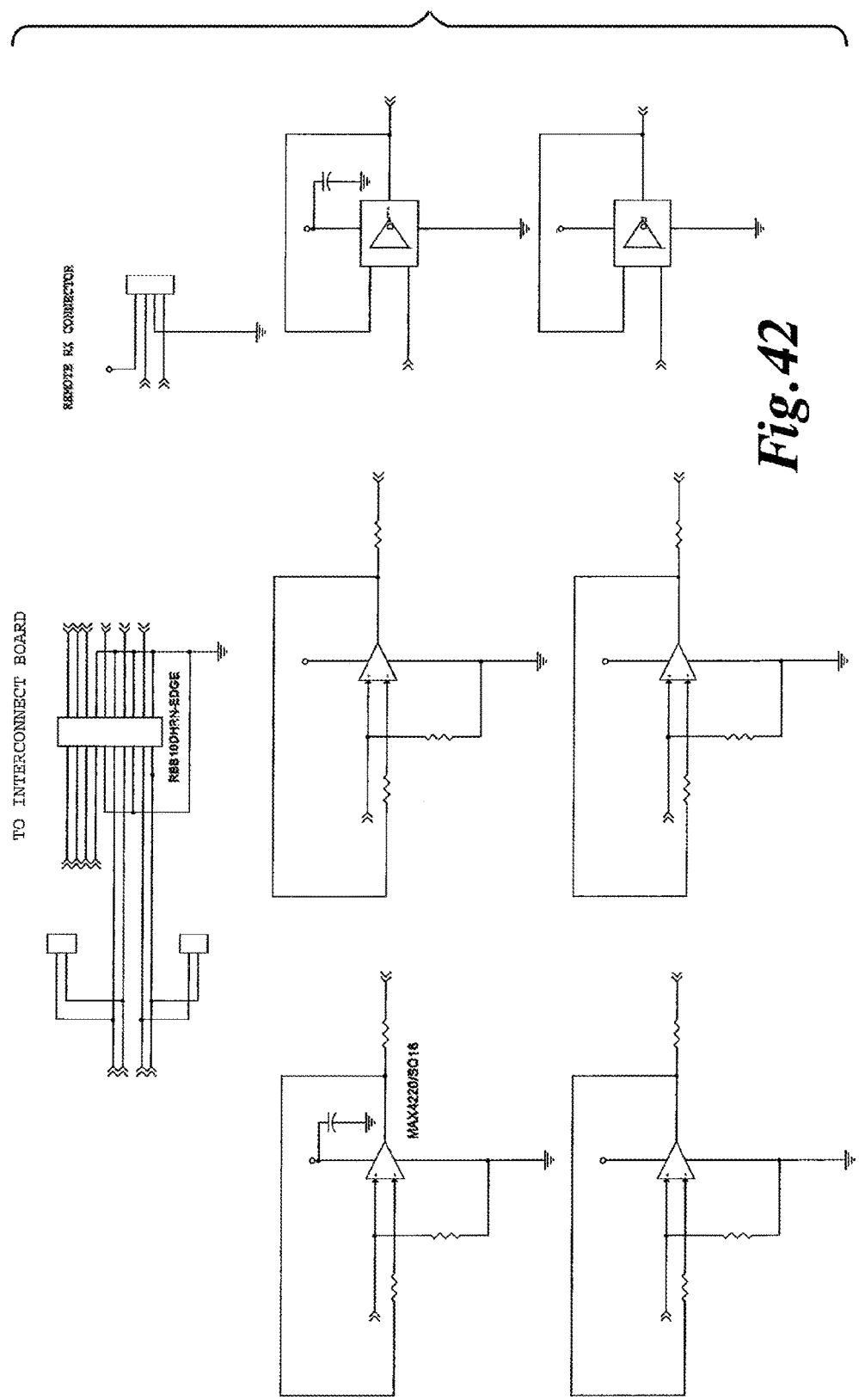
FIG. 42 is a partial electrical schematic of one alternative embodiment of an LED light fixture.
Figure 43:
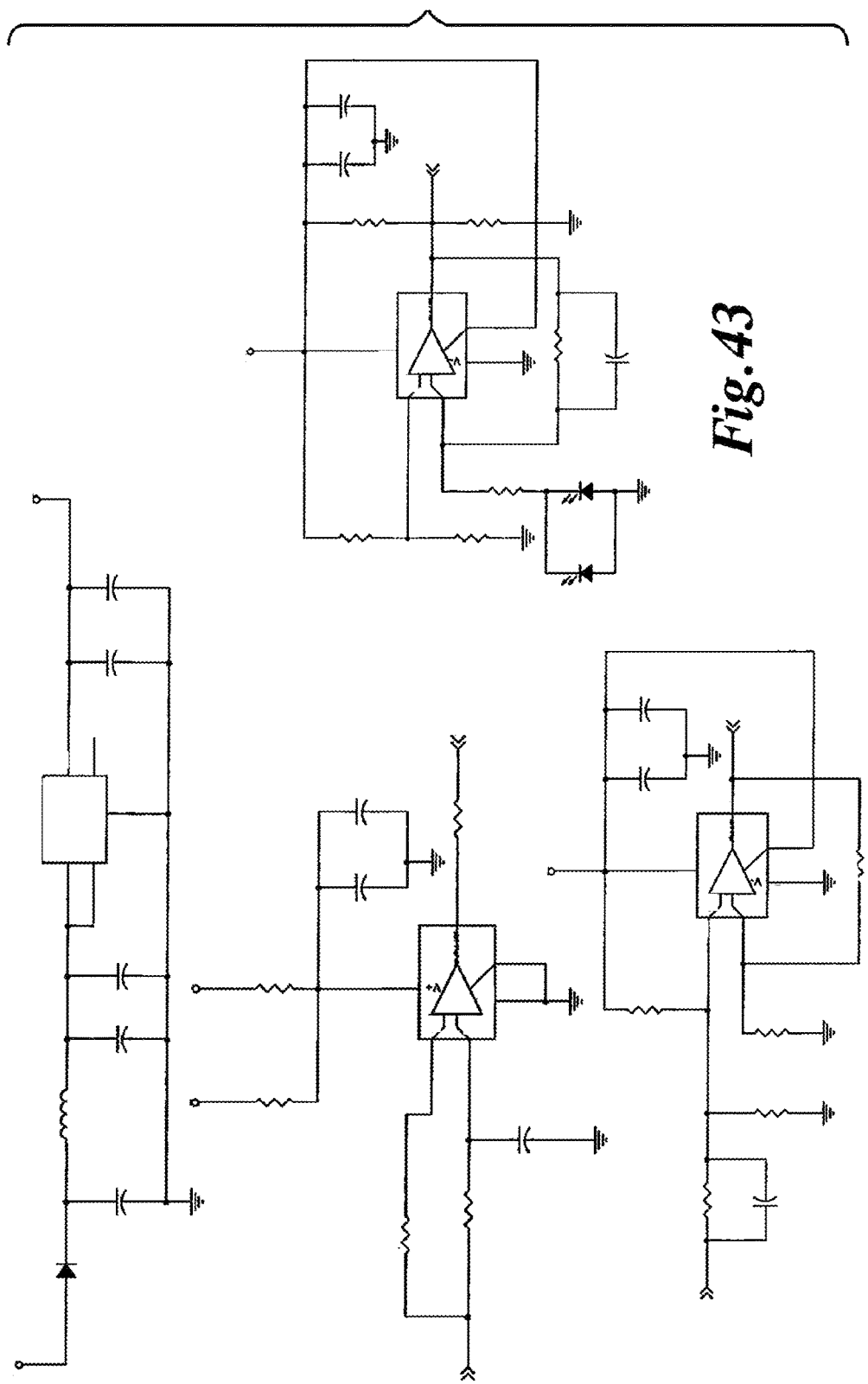
FIG. 43 is a partial electrical schematic of one alternative embodiment of an LED light fixture.
Figure 44:
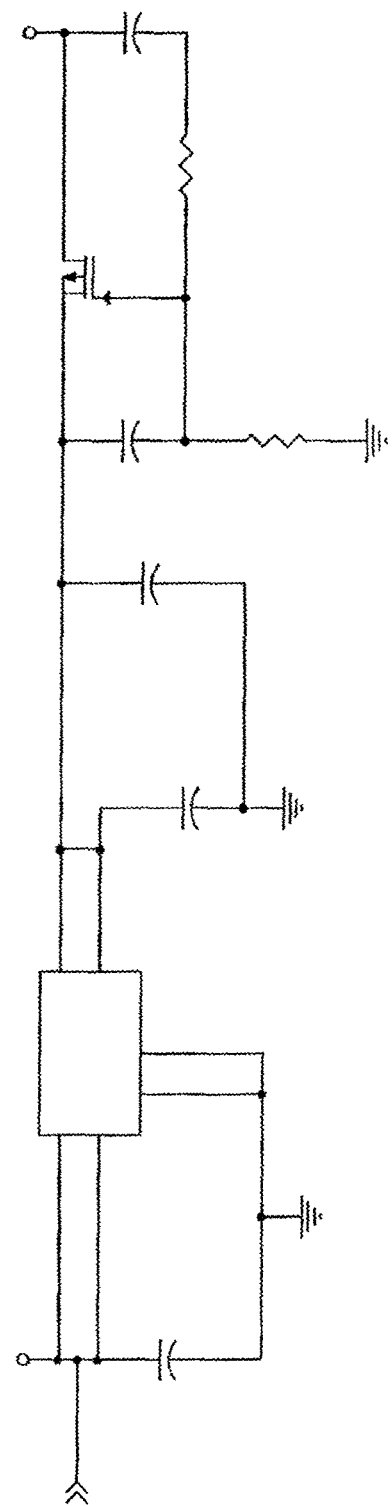
FIG. 44 is a partial electrical schematic of one alternative embodiment of an LED light fixture.

In some embodiments as depicted in further detail in FIG. 24 the semi-spherical or parabolic surface 36, which is constructed and arranged to hold a spherical object or ball lens 38, is polished. The inner lens retainer assembly 32 preferably includes a light passage opening 44 which is disposed above and LED 30 to permit light to enter spherical object or ball lens 38. It should be noted that in some embodiments that spherical object or ball lens 38 may be semi-spherical or flat.

In some embodiments as depicted in FIG. 23 the outer lens retainer assembly 42 includes surfaces 46, 48, 52, and 54. In some embodiments, surface 46 is disposed at least partially over spherical object 38 to releasably and securely position spherical object 38 in the semi-spherical or parabolic surface 36. In some embodiments one or more surfaces 46, 52, and 54 may be polished to enhance performance of transmission of light including communication and/or information/data transmissions.

In some embodiments, surface 48 is the exterior surface of the outer lens retainer assembly 42 and may be used to rotate and secure the outer lens retainer assembly 42 over the inner lens retainer assembly 36.

Enclosed herewith and incorporated by reference herein in their entireties are the following United States Patent Numbers and patent application numbers: U.S. Pat. Nos. 6,879,263; 7,046,160; 7,439,847; 7,902,978; 8,188,861; 8,188,878; 8,188,879; 8,330,599; 8,331,790; 8,543,505; 8,571,411; 8,593,299; Ser. Nos. 11/433,979; 12/032,908; 12/126,227; 12/126,342; 12/126,469; 12/126,647; 12/750,796; 13/427,358; 13/479556; 13/706,864; 13/972,294; 14/033,014; 14/050,759; 14/050,765; 61/778,672; 61/783,501; 61/819,861; 61/867,731; 61/927,638; and 61/927,663.

This application is also related to the patent application entitled "Method of Measuring and Provision of Lumens,"

U.S. patent application Ser. No. 14/207,934 filed Mar. 13, 2104, which is incorporated by reference herein in its entirety. The present application is also related to the patent application entitled "Pulsed Light Communication Key," U.S. patent application Ser. No. 14/208,090 filed Mar. 13, 2104, which is incorporated by reference herein in its entirety. Also the present application is related to the patent application entitled "LED Light Control and Management System," U.S. patent application Ser. No. 14/208,125 filed Mar. 13, 2104, which is incorporated by reference herein in its entirety.

In addition to being directed to the embodiments described above and claimed below, the present invention is further directed to embodiments having different combinations of the features described above and claimed below. As such, the invention is also directed to other embodiments having any other possible combination of the dependent features claimed below.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

I claim:

1. An LED light fixture comprising:
    at least one optical transceiver comprising at least one location identifier, the optical transceiver further comprising:
    at least one light emitting diode, at least one photodetector, and a camera, said at least one light emitting diode generating light in the visible spectrum, said light comprising a plurality of flashes of light, said flashes of light being at a frequency which is not observable to the unaided eyes of an individual; and
    a processor in communication with the at least one light emitting diode, the processor being constructed and arranged to regulate said plurality of flashes of light to transmit at least one transmitted signal, said at least one transmitted signal comprising said at least one location identifier and said at least one transmitted signal being embedded within said light, and said at least one photodetector being constructed and arranged for receipt of at least one received light signal,
    said at least one optical transceiver further comprising a lens proximate to said at least one light emitting diode.

2. The LED light fixture of claim 1, wherein said at least one transmitted signal or said at least one received light signal comprises time and date information.

3. The LED light fixture of claim 1, wherein said light in the visible spectrum has a wavelength between white and yellow.

4. The LED light fixture of claim 1, wherein said at least one transmitted signal or said at least one received light signal provides access to one of the group consisting of a door, drawer, computer, and thermostat.

5. The LED light fixture of claim 1, said LED light fixture further comprising a microphone in communication with said at least one optical transceiver.

6. The LED light fixture of claim 1, said LED light fixture further comprising a microphone or a speaker in communication with said at least one optical transceiver.

7. The LED light fixture of claim 1, said at least one optical transceiver further comprising a plurality of light emitting diodes disposed in at least one of rows and columns.

8. The LED light fixture of claim 1, said at least one optical transceiver further comprising a lower casing, an upper casing, and a circuit board disposed between said lower casing and said upper casing, said circuit board being in electrical communication with said at least one light emitting diode and said photodetector.

9. The LED light fixture of claim 8, further comprising a lens assembly, said lens assembly comprising said lens and a retaining surface, said retaining surface being semi-spherical in shape.

10. The LED light fixture of claim 9, wherein said lens is spherical.

11. The LED light fixture of claim 10, said at least one optical transceiver further comprising an outer lens retainer assembly disposed over said lens assembly and said lens.

12. The LED light fixture of claim 11, wherein said lens assembly traverses said upper casing.

13. An LED light fixture comprising:
    at least one optical transceiver comprising at least one location identifier, the optical transceiver further comprising:
    at least one light emitting diode light unit comprising a plurality of light emitting diodes and at least one photodetector attached thereto, a camera, and a microphone, said plurality of light emitting diodes generating light in the visible spectrum, said light comprising a plurality of flashes of light, said flashes of light being at a frequency which is not observable to the unaided eyes of an individual; and
    a processor in communication with the light emitting diode light unit and said at least one photodetector, said camera and said microphone, said processor being constructed and arranged to regulate said plurality of flashes of light to transmit at least one transmitted signal embedded within said light, said at least one transmitted signal comprising said at least one location identifier, and said at least one photodetector being constructed and arranged for receipt of at least one received light signal, said at least one received light signal comprising at least one received light signal location identifier, said at least one received light signal comprising a plurality of flashes of light, said flashes of light being at a frequency which is not observable to the unaided eyes of an individual.

14. The LED light fixture of claim 13, further comprising a lens proximate to at least one of said plurality of light emitting diodes, said at least one optical transceiver further comprising a lower casing, an upper casing, and a circuit board disposed between said lower casing and said upper casing, said circuit board being in electrical communication with at least one of said plurality of light emitting diodes and said photodetector.

15. The LED light fixture of claim 14, further comprising a lens assembly, said lens assembly comprising said lens and a retaining surface, said retaining surface being semi-spherical in shape.

16. The LED light fixture of claim 15, wherein said lens is spherical.

17. The LED light fixture of claim 16, said at least one optical transceiver further comprising an outer lens retainer assembly disposed over said lens assembly and said lens.

18. The LED light fixture of claim 17, wherein said outer lens retainer assembly is constructed to releasably engage said lens assembly and said upper casing.

* * * * *